(12) United States Patent
Motoyama

(10) Patent No.: US 8,605,339 B2
(45) Date of Patent: Dec. 10, 2013

(54) OPTICAL READING DEVICE, CONTROL METHOD FOR AN OPTICAL READING DEVICE, AND STORAGE MEDIUM

(75) Inventor: Hiroyuki Motoyama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 306 days.

(21) Appl. No.: 13/183,863

(22) Filed: Jul. 15, 2011

(65) Prior Publication Data

US 2012/0019878 A1    Jan. 26, 2012

(30) Foreign Application Priority Data

Jul. 26, 2010  (JP) ................................. 2010-166797

(51) Int. Cl.
  *H04N 1/04*    (2006.01)
(52) U.S. Cl.
  USPC ............ 358/474; 358/496; 358/497; 358/498
(58) Field of Classification Search
  USPC .................. 358/474, 496, 497, 498
  See application file for complete search history.

(56) References Cited

U.S. PATENT DOCUMENTS

| 5,444,550 A | 8/1995 | Enokida et al. |
| 6,373,550 B2 * | 4/2002 | Tsuchihashi et al. ........... 355/40 |
| 2005/0141044 A1 | 6/2005 | Morita |

FOREIGN PATENT DOCUMENTS

| JP | 11-122400 | 4/1999 |
| JP | 2005-167938 | 6/2005 |
| JP | 2009-284191 | 12/2009 |

* cited by examiner

*Primary Examiner* — Houshang Safaipour

(57) ABSTRACT

An optical reading device, a control method for an optical reading device, and a program for directing execution of the method each enables efficient and quick transmission of digital image data obtained from reading a document to a host computer or other control device. A dot impact printer having an optical reading device that optically reads documents and stores the resulting digitized image data, sets target reading areas, and transmits digital image data stored in a scan buffer rendered in a RAM to the host computer. When multiple target areas are set, the transmission order of the target areas is determined according to specific conditions, and the target areas are transmitted according to this transmission sequence.

15 Claims, 14 Drawing Sheets

OPTICAL READING DEVICE, CONTROL METHOD FOR AN OPTICAL READING DEVICE, AND STORAGE MEDIUM

BACKGROUND

1. Technical Field

The present invention generally relates to an optical reading device that conveys and optically reads media to be scanned, to a method of controlling such an optical reading device, and to a tangible medium that stores a program for directing the execution of such a method.

2. Related Art

Optical reading devices such as scanners that are connected to a host computer store images read from a document (media to be scanned) in buffer memory, and send the scanned data stored in buffer memory to the host computer after scanning the document is completed. See, for example, Japanese Unexamined Patent Appl. Pub. JP-A-2009-284191.

Buffer memory capacity is normally limited, and it is therefore preferable to quickly send images stored in buffer memory to the control device while scanning and to delete the transmitted images from the buffer so that the next document can be scanned. A method of efficiently sending images captured by the optical scanner to the control device is therefore needed.

SUMMARY

An optical reading device, a control method for such an optical reading device, and a program for directing execution of the same according to the invention enable efficiently and quickly sending scanned images optically obtained from a medium by the optical reading device to a host computer or other control device.

A first aspect of the invention is an optical reading device including: an optical reading unit that optically reads information on a medium, e.g., a document and converts the read information to digital image data; a storage unit that stores the digital image data captured by the optical reading unit; a transmission unit that transmits the digital image data to a control device; and a control unit that sets multiple target areas on the medium, determines the transmission sequence of multiple portions of the digital image data obtained from the multiple target areas respectively according to a specific condition, and causes the transmission unit to send the multiple portions of the digital image data to the control device in accordance with the transmission sequence.

As a result, digital image data obtained from the document or other medium can be quickly transmitted to the control device, thereby lessening local storage overhead requirements.

In another aspect of the invention, the control unit sets an area on the medium where the brightness of corresponding digital image data is lower than the brightness of surrounding digital image data as one target area.

Portions of the digital image data where brightness is high are often from part of the paper where nothing is written, and portions where brightness is low are often from parts containing text or other markings. A specific threshold value can therefore be used to discriminate high brightness portions and low brightness portions of data captured from the entire surface of the medium to set the target areas. The image data where brightness is low can be extracted as portions containing text or other desired content.

Alternatively, the target areas can be set based on a command that sets the target areas and is received from the control device. This provides the option of transmitting only the scanned image data for those parts containing meaningful text or other images possible, and enables quickly deleting the already transmitted image data from the storage unit and thereby freeing more space in the storage area. As a result, the next image data scanned can be quickly stored. Scanned data can thus be quickly transmitted to the control device, and the storage capacity of the storage unit can be used efficiently. In addition, delaying the scanning operation due to insufficient storage capacity in the storage unit can be avoided, and throughput can be improved.

An optical reading device according to another aspect of the invention preferably also has a transportation mechanism that conveys the medium along a transportation path, and has at least one optical reading unit that is disposed to the transportation path and that reads at least one side of the medium as it passes the optical reading unit (s).

This aspect of the invention facilitates quickly scan a large area on one document. Furthermore, if two optical reading units are disposed, one on each of the front and back sides of the document, on the transportation path, both sides can be scanned in one pass. In this configuration the target areas are set on front and back sides, the transmission sequence is determined for the target areas on both sides, and the scanned or digital image data is transmitted according to the transmission sequence.

In an optical reading device according to another aspect of the invention, the control unit preferably detects a communication state of the control device, and based on the communication state determines the transmission sequence.

This aspect of the invention determines the transmission sequence of the scanned image data of the target areas based on the communication status, such as the transmission status or the reception status, of the control device. Whether the period in which the control device can receive data (ready state) is long, that is, that the period for which data cannot be received (busy state) is short, can be determined based on information sent from the control device, or the interval between responses sent from the control device each time data is received, and it can therefore be concluded that the processing load on the control device is light or that a long communication time is available. As a result, scanned image data that is large in size can be transmitted first and a large storage area can be released in the storage unit when it is determined that much time will not be required to transmit a large amount of image data.

However, by detecting that the period for which data cannot be received (busy state) is long, that is, that the period in which the control device can receive data (ready state) is short, it can be concluded that the processing load on the control device is heavy or that a long communication time cannot be taken. As a result, when it is determined that the process load on the control device will be further increased and a long time will be required to transmit a large amount of scanned image data, scanned image data that is small in size can be transmitted first to reduce the load on the control device. Large amounts of image data can then be transmitted after the load on the control device becomes lighter or more communication time can be taken. The image data transmission order can therefore be optimized according to the state of the control device.

In an optical reading device according to another aspect of the invention, the control unit sets the transmission sequence of at least some of the portions of digital image data based on their respective sizes, which can be from large to small or vice versa. As a result, scanned images containing a large amount of data can be transmitted first and the image data storage area in the storage unit can be quickly released, or scanned images containing a small amount of data can be transmitted first to reduce the load on the control device and the optical reading device when transmission starts. Also, compatibility with prioritizing quick release of storage space in the storage unit, and prioritizing reducing the load on the control device and optical reading device, can be achieved by switching between these methods of determining the transmission order, and throughput can be improved while avoiding an extreme load on the devices.

In an optical reading device according to another aspect of the invention, the control unit determines the size of a particular portion of digital image data of a particular target area based on at least one of: the size of such portion of data in the transportation direction of the particular target area, and the size of such portion of data of the particular target area in the direction perpendicular to the transportation direction of such target area. This aspect facilitates efficient transmission of the data and thereby improves throughput.

Another aspect of the invention segments a particular portion of digital image data of a particular target area into blocks when the size of such portion of data exceeds a specific limit. This aspect of the invention can segment and send the image data in units sized for reading from the storage unit or units sized for transmission.

In an optical reading device according to another aspect of the invention, the control unit determines the transmission sequence in the order in which the optical reading unit starts scanning or the order in which the optical reading unit completes scanning. As a result, storage space in the storage unit can be quickly released and throughput can be improved.

When there are two optical reading units disposed on opposite (front and back) sides of the document, associated data from target areas from both sides of the document can be transmitted in the order in which scanning starts or the order in which scanning is completed.

Another aspect of the invention is a control method for an optical reading device that is connectable to a control device. The method involves steps in which the functionality described above in connection with the optical reading device is carried out.

Still another aspect of the invention is a non-transitory storage medium storing a program executable by a control unit that controls at least a portion of an optical reading device that is connectable to a control device. The program contains instructions for carrying out the functionality described above.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
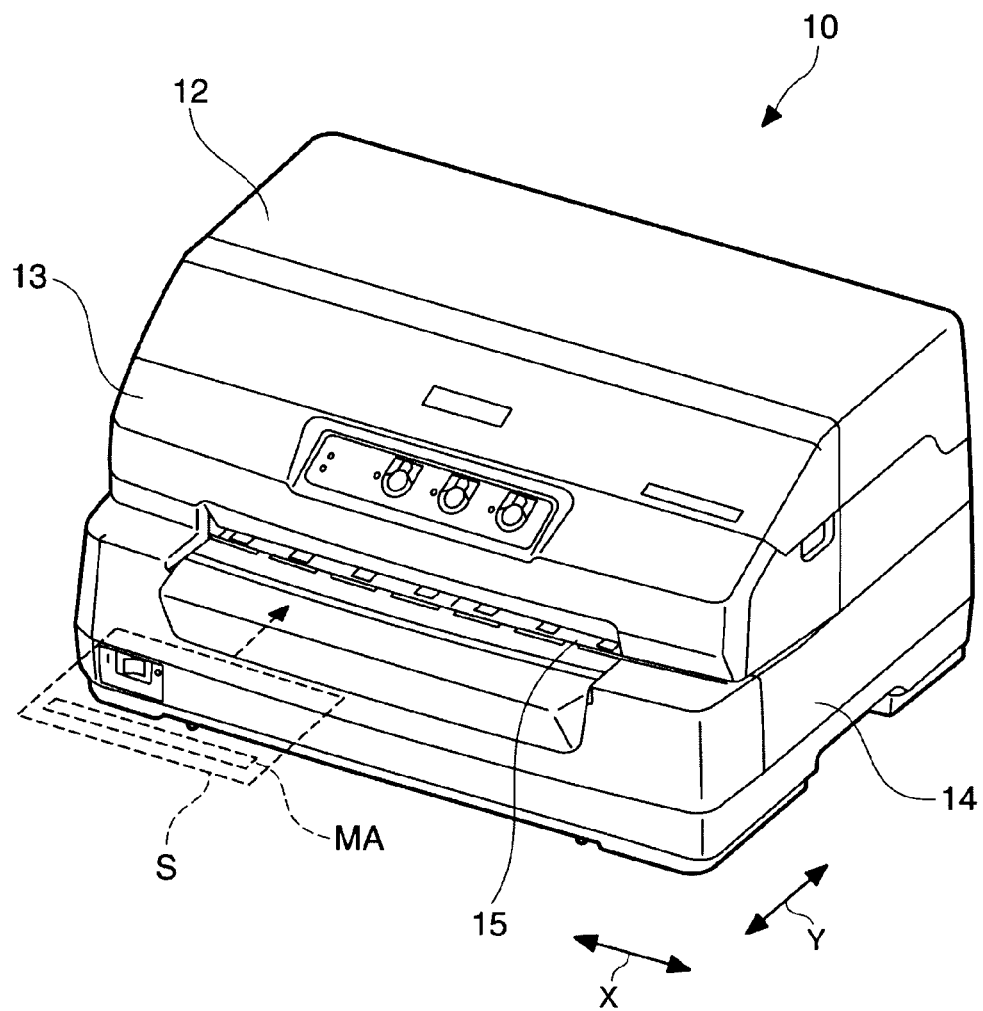
FIG. 1 is an external oblique view of a dot impact printer according to a preferred embodiment of the invention.
Figure 2:
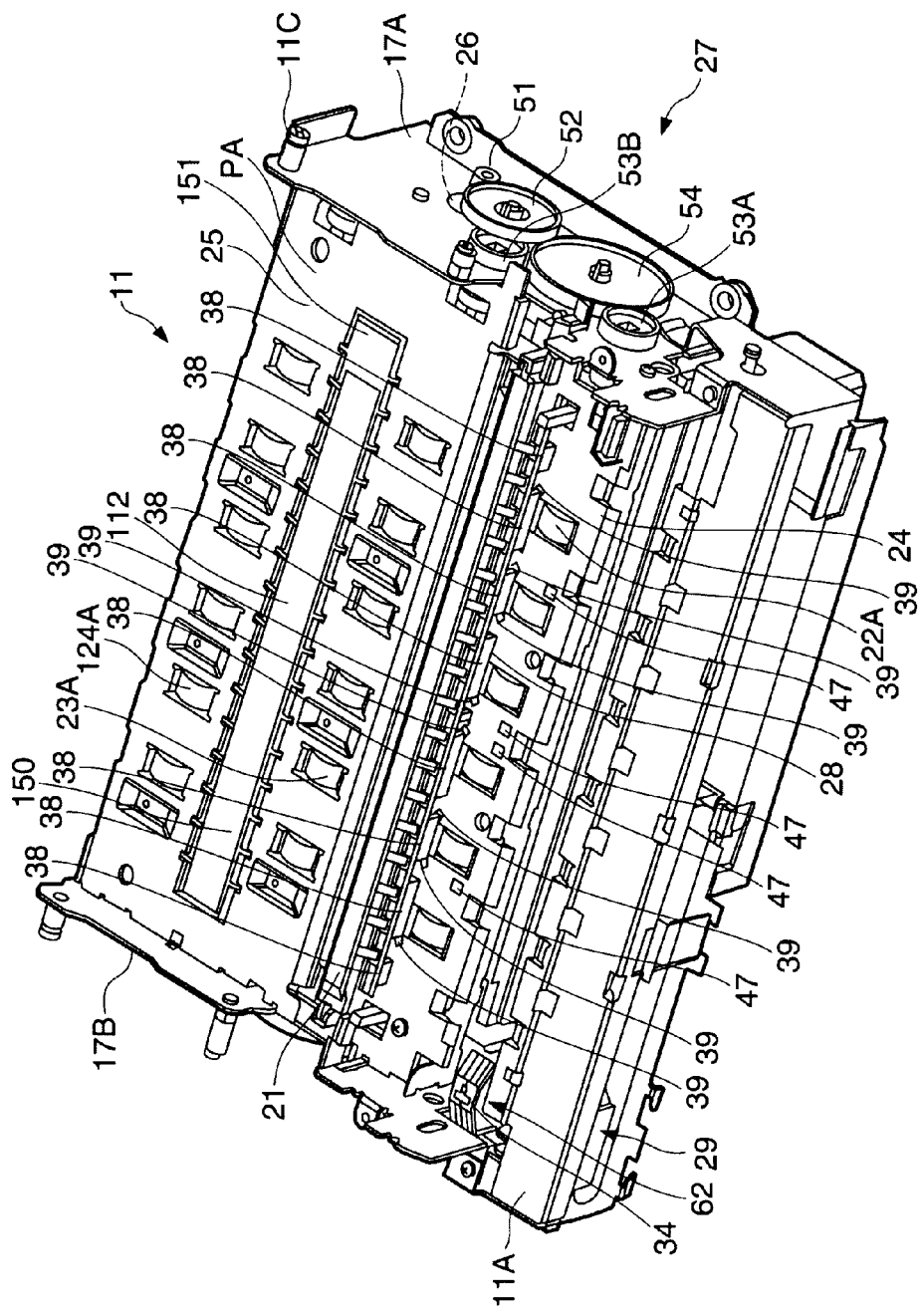
FIG. 2 is an oblique view of the print assembly.
Figure 3:
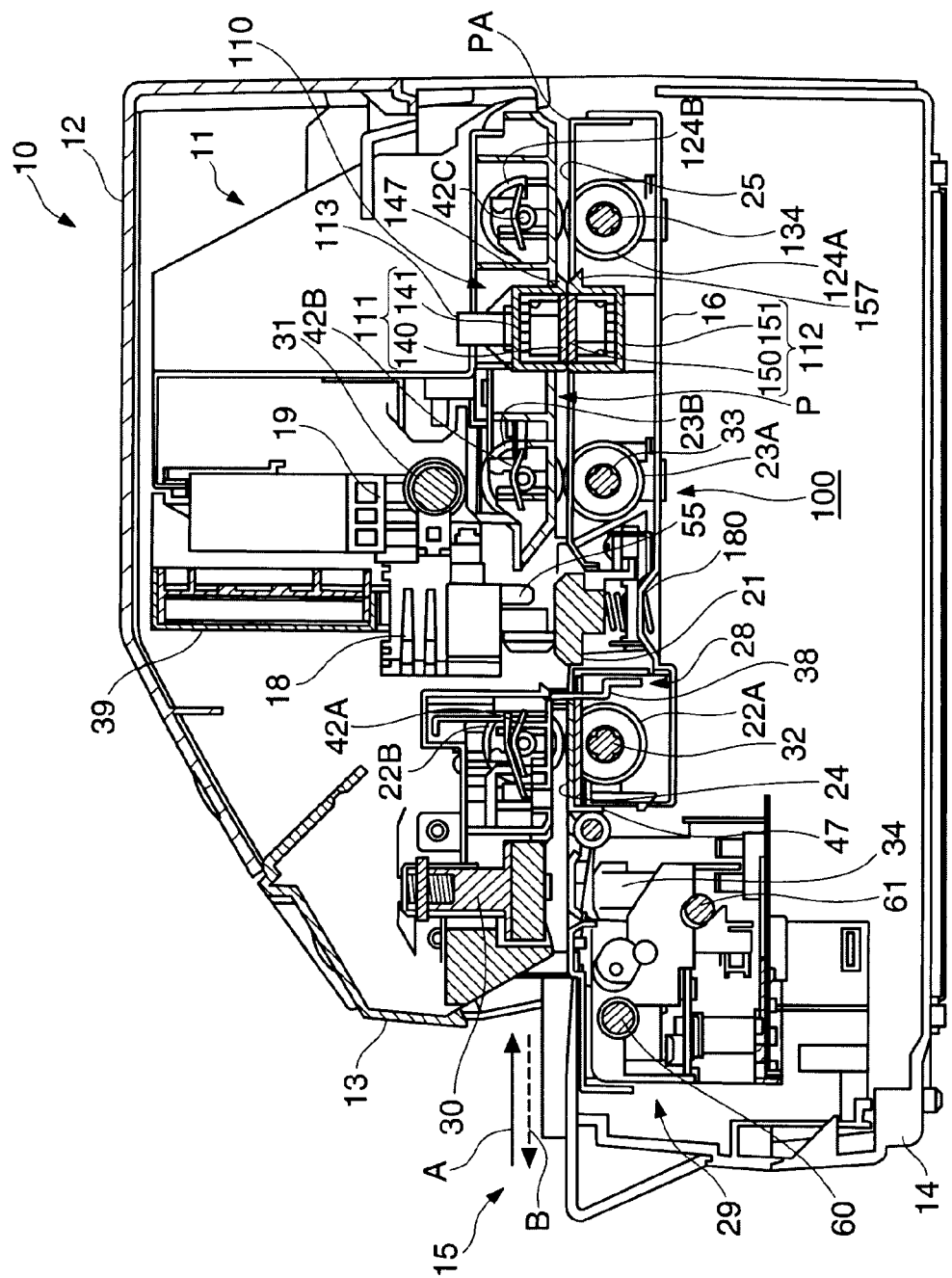
FIG. 3 is a side section view of the print assembly.

FIG. 1 is a front oblique view showing the appearance of a dot impact printer according to a preferred embodiment of the invention. FIG. 2 is an oblique view of the print assembly 11. FIG. 3 is a side section view of the dot impact printer 10 in FIG. 1.

The dot impact printer 10 shown in FIG. 1 records images, including text, by driving plural recording wires of a recording head 18 (see FIG. 3) against a recording medium S with an ink ribbon (not shown in the figure) delivered from a ribbon cartridge (not shown in the figure) therebetween in order to form dots on the recording surface of the recording medium S. The dot impact printer 10 has an optical reader (scanner) 110 (FIG. 3) and also functions as an optical reading device that can optically read text, symbols, images, and other content on the surface of the recording medium S.

Cut-sheet media that is precut to a certain length, and continuous media having numerous sheets connected in a continuous web, are examples of recording media S (media) that can be used in the dot impact printer 10. Cut-sheet media include, for example, single slips and multipart forms, passbooks, postcards, and letters. Continuous media include continuous multipart form paper and perforated fanfold paper. In this embodiment of the invention checks and promissory notes (collectively referred to herein as simply checks) issued on a bank account, for example, and passbooks issued by a bank or other financial institution, are used as the recording medium S.

Checks are slips on which MICR (magnetic ink character recognition) information containing the user's account number and a serial check number, for example, are printed in a MICR area MA on the front of the check. A passbook is a bound booklet of plural blank pages that can be printed on when the passbook is open. A magnetic stripe is typically rendered on the outside surface of one of the passbook covers.

Note that of the four sides of a rectangular recording medium S, the edge on the side that is inserted to the dot impact printer 10 is referred to herein as the leading edge or end, and the edge on the opposite end as the leading end is referred to as the trailing edge or end.

As shown in FIG. 1, the dot impact printer 10 has a top cover 12, a top case 13, and a bottom case 14 as outside case members, and a manual insertion opening 15 in the front of the top case 13 and bottom case 14 where the recording medium S is inserted and discharged. A paper exit 20 from which the recording medium S may be discharged is also formed at the back of the top case 13 and bottom case 14. Whether the recording medium S processed by the dot impact printer 10 is discharged from the manual insertion opening 15 or the paper exit 20 is controlled by a command sent to the dot impact printer 10 from the host computer 200 described below.

The side where the manual insertion opening 15 is rendered, that is, the left side as seen in FIG. 3, is referred to herein as the front, and the side where the paper exit 20 is rendered, that is, the right side in FIG. 3, is referred as the rear or back.

As shown in FIG. 2, the dot impact printer 10 has a print assembly 11 that is covered by the foregoing case members. The print assembly 11 includes a bottom chassis part 11A and a top chassis part (not shown in the figure) that is supported by pins 11C at the back of the bottom chassis part 11A. The top chassis part can pivot by operating a lever (not shown in the figure) disposed on the left side of the top chassis part, and the inside of the print assembly 11 is exposed when the top chassis part pivots open.

As shown in FIG. 2 and FIG. 3, the print assembly 11 includes a base frame 16 and a right side frame 17A and left side frame 17B pair attached to the sides of the base frame 16. The side frames (not shown in the figure) of the top case chassis part are disposed on the outside of the side frames 17A and 17B with a carriage guide shaft 31 spanning therebetween and a flat front media guide 24 and rear media guide 25 affixed between the side frames 17A and 17B. A flat platen 21 is disposed between the front media guide 24 and rear media guide 25, and the recording head 18 is disposed above the platen 21 facing the platen 21.

The recording head 18 is mounted on a carriage 19 that is fit freely slidably on the carriage guide shaft 31. The carriage 19 is driven through an intervening timing belt (not shown in the figure) by the forward or reverse rotation of a carriage drive motor 56 (FIG. 4) that drives the carriage 19, and the carriage 19 thus moves reciprocally guided by the carriage guide shaft 31. The carriage 19 scans bidirectionally between the side frames of the top chassis part in the direction indicated by arrow X in FIG. 1, that is, in the main scanning direction aligned with the axial direction of the carriage guide shaft 31 and the long side of the platen 21. Note that the direction perpendicular to the main scanning direction X of the carriage 19, that is, the direction indicated by arrow Y in FIG. 1, is the secondary scanning direction.

While the recording head 18 carried on the carriage 19 travels in the main scanning direction with the carriage 19, recording wires are pushed out from the wire face (not shown in the figure) on the distal end of the recording head 18 opposite the platen 21 to strike the ink ribbon and transfer ink from the ink ribbon to the recording medium S conveyed between the platen 21 and the recording head 18, and record an image, which may include text, on the recording medium S. The ink ribbon is stored folded inside a ribbon cartridge (not shown in the figure) that is mounted on the main frame or the carriage 19, and is delivered to the recording head 18 while the carriage 19 scans the recording medium. As shown in FIG. 3, a media width sensor 55 is disposed behind the recording head 18 at a position above the platen 21. The media width sensor 55 is mounted on the carriage 19 and travels with the carriage 19 over the platen 21, and is used to determine the positions of the side edges of the recording medium S and the width of the recording medium S.

As shown in FIG. 2 and FIG. 3, the platen 21 is flat and extends in the scanning direction of the carriage 19, and is flexibly supported and urged toward the recording head 18 by an urging spring 180. The urging spring 180 is a compression spring, and the striking force of the recording wires during the recording operation of the recording head 18 is assisted by the urging force of the urging spring 180. When the thickness of the recording medium S varies while the recording medium S is conveyed, or when recording media S of different thicknesses are conveyed to the print assembly 11, the platen 21 is pushed by the distal end of the recording head 18 in resistance to the urging force of the urging spring 180 and moves away from the recording head 18. As a result, the gap between the distal end of the recording head 18 and the recording surface of the recording medium S is held constant regardless of the thickness of the recording medium.

As shown in FIG. 3, the printer assembly 11 includes a media transportation mechanism (transportation mechanism) 100 that conveys the recording medium S, an alignment mechanism 28 that contacts the leading end of the recording medium S conveyed by the media transportation mechanism 100 and aligns the recording medium S, a magnetic data reading unit 29 having a magnetic head 34 that reads the MICR information printed on a check or reads or writes magnetic information in the magnetic stripe on a passbook, and a media pressure unit 30 that pushes down on the recording medium S to prevent the recording medium S from lifting up during magnetic information processing, including when the magnetic head 34 of the magnetic data reading unit 29 reads the MICR information.

As shown in FIG. 2 and FIG. 3, the media transportation mechanism 100 includes the platen 21, a first drive roller 22A, a first follower roller 22B, a second drive roller 23A, a second follower roller 23B, a third drive roller 124A, a third follower roller 124B, the front media guide 24, the rear media guide 25, a media transportation motor 26, and a drive wheel train 27. The media transportation mechanism 100 renders a transportation path P through which the recording medium S is conveyed over the front media guide 24 and rear media guide 25. The tops of the front media guide 24 and rear media guide 25 are conveyance surface PA of the transportation path P.

In this embodiment of the invention the first drive roller 22A and first follower roller 22B are disposed on the front side of the printer assembly 11 relative to the platen 21 and recording head 18, and the second drive roller 23A and second follower roller 23B pair, and third drive roller 124A and third follower roller 124B pair, are disposed sequentially on the rear side of the printer assembly 11 relative to the platen 21 and recording head 18.

The first drive roller 22A and first follower roller 22B are disposed as a roller pair one above the other, the second drive roller 23A and second follower roller 23B are disposed as a roller pair one above the other, and the third drive roller 124A and third follower roller 124B are disposed as a roller pair one above the other.

The first drive roller 22A, second drive roller 23A, and third drive roller 124A are drive rollers that are driven rotationally by the media transportation motor 26 and drive wheel train 27. The first follower roller 22B, second follower roller 23B, and third follower roller 124B are follower rollers that are urged by springs 42A, 42B, and 42C with specific pressure to the first drive roller 22A, second drive roller 23A, and third drive roller 124A side, respectively. As a result, the first drive roller 22A and first follower roller 22B are rotationally driven in mutually opposite directions, the second drive roller 23A and second follower roller 23B are rotationally driven in mutually opposite directions, and the third drive roller 124A and third follower roller 124B are rotationally driven in mutually opposite directions.

The drive wheel train 27 is disposed on the outside of the right side frame 17A as shown in FIG. 2. The drive wheel train 27 has a motor pinion 51 that is affixed to rotate in unison with the drive shaft of the media transportation motor 26, which can rotate in forward and reverse directions. Drive power from the motor pinion 51 is transferred through a speed reducing gear 52 to a second drive gear 53B affixed to the second roller shaft 33 of the second drive roller 23A, and is transferred from this second drive gear 53B through an intermediate gear 54 to a first drive gear 53A affixed to the first roller shaft 32 of the first drive roller 22A.

Torque from the second roller shaft 33 of the second drive roller 23A is transferred to the third roller shaft 134 of the third drive roller 124A by a drive belt (not shown in the figure), for example. As a result, the first drive roller 22A, second drive roller 23A, and third drive roller 124A shown in FIG. 3 rotate in the same direction and can convey the recording medium S in the printer assembly 11. More specifically, when the media transportation motor 26 rotates forward, the first drive roller 22A, second drive roller 23A, and third drive roller 124A shown in FIG. 3 convey the recording medium S in the secondary scanning direction Y inside the printer assembly 11 as denoted by arrow A in the figure, and convey the recording medium S in the direction in which it is discharged from the printer assembly 11 as indicated by arrow B in the figure when the media transportation motor 26 turns in reverse.

The alignment mechanism 28 aligns the recording medium S before the recording head 18 prints on the recording medium S and before the optical reader 110 scans the recording medium S. The alignment mechanism 28 includes plural alignment plates 38 and an alignment plate motor (see FIG. 4) that drives the alignment plates 38. The alignment plates 38 are arrayed in the main scanning direction between the first drive roller 22A and first follower roller 22B and the recording head 18 and platen 21, and can protrude into the transportation path P. The alignment mechanism 28 aligns the orientation of the recording medium S by causing the leading end of the recording medium S to contact the alignment plates 38.

As shown in FIG. 2, the printer assembly 11 has a plurality of alignment sensors 39 that detect the presence of the recording medium S driven in contact with the alignment plates 38. The alignment sensors 39 are disposed to the transportation path P arrayed in the main scanning direction near the upstream side of the alignment plates 38, and are transmissive sensors including a light-emitting unit (such as an LED) and a photodetection unit (such as a phototransistor) disposed with the transportation path P therebetween. Whether the skew of the recording medium S to the transportation direction after alignment by the alignment mechanism 28 is within the allowable range can be determined from the number and positions of the plural alignment sensors 39 that detect the leading end of the recording medium S.

The dot impact printer 10 has a control circuit board (not shown in the figure) located behind and below the print assembly 11, for example, as a control unit that controls dot impact printer 10 operations, including driving the media transportation motor 26, carriage 19 scanning, the recording operation of the recording wires of the recording head 18, and the reading (scanning) operation of the optical reader 110.

The printer assembly 11 also has a plurality of media edge sensors 47 that detect insertion of a recording medium S to the transportation path P in front of the first drive roller 22A. The media edge sensors 47 are reflective sensors having a light-emitting unit that emits light toward the transportation path P and a photodetection unit that detects the reflection of the emitted light, and detect the recording medium S inserted from the manual insertion opening 15. Note that the media edge sensors 47 may alternatively be transmissive sensors having a light-emitting unit and a photodetection unit disposed with the transportation path P therebetween. This configuration determines that a recording medium S was inserted to the transportation path P when the photodetection units of all insertion detection sensors 47 sense light and then detection of light by any one of the insertion detection sensors 47 is blocked.

As shown in FIG. 3, the print assembly 11 has an optical reader 110 (optical reading unit) that reads text, symbols and images presented on the surface of the recording medium S. The optical reader 110 includes a first scanner 111 that reads information printed or otherwise presented on the top surface of the recording medium S, and a second scanner 112 disposed opposite the first scanner 111 that similarly reads information printed or otherwise presented on the bottom surface of the recording medium S. The recording medium S is normally inserted from the manual insertion opening 15 so that the side on which the MICR information is printed is on the bottom.

The first scanner 111 and second scanner 112 are optical image sensors that are disposed between the second drive roller 23A and third drive roller 124A and continuously read information from the recording medium S conveyed through the transportation path P.

The first scanner 111 and second scanner 112 may be contact image sensors (CIS), for example, and respectively have a flat glass plate 140, 150 that contacts the recording medium S, and a support frame 141, 151 that supports the glass plate 140, 150. An emitter (not shown in the figure) that illuminates the recording medium S with light output from an LED or other light source, a plurality of photosensors (not shown in the figure) arrayed in a single row in the main scanning direction (X axis), and an output unit (not shown in the figure) that outputs the signals from the photosensors to the control circuit unit described above, are housed inside the support frames 141, 151. The first scanner 111 and second scanner 112 are not limited to CIS scanners, however, and CCD (charge coupled device) scanners may be used instead.

As shown in FIG. 2, the second scanner 112 has a support frame 151 and glass plate 150 extending lengthwise across the width of the dot impact printer 10 parallel to the platen 21. The support frame 151 is disposed so that the top surface of the glass plate 150 is exposed to the transportation path P through a window formed in the rear media guide 25. The first scanner 111 is disposed above the second scanner 112 as shown in FIG. 3 so that the bottom surface of the glass plate 140 is opposite the top of glass plate 150, and likewise extends in the main scanning direction with substantially the same length as the second scanner 112.

An urging member 113 is disposed above the first scanner 111, and the first scanner 111 is urged toward the recording medium S on the rear media guide 25 by the urging member 113. The urging member 113 pushes the first scanner 111 to the second scanner 112 with substantially uniform pressure across the width. A coil spring, flat spring, or elastomer cushion, for example, can be used as the urging member 113. A gap that accommodates recording media of a specific thickness is rendered between the surfaces of the glass plates 140, 150. When scanning a recording medium S, the first scanner 111 is pushed up by the conveyed recording medium S and the urging member 113 contracts, allowing the recording medium S to pass between the glass plates 140, 150. More specifically, the scanning quality of the optical reader 110 is improved by the first scanner 111 that is urged by the urging member 113 pushing the recording medium S to the second scanner 112 side so that the recording medium S reliably contacts the surfaces of the glass plates 140, 150.

The photosensors (not shown in the figure) of the first scanner 111 and second scanner 112 are arrayed in a row in the main scanning direction of the dot impact printer 10, and scan lines extending in the main scanning direction. The photosensors of the first scanner 111 and second scanner 112 are disposed across a wider range in the main scanning direction than the printing range of the recording head 18, and can scan a wider range than any recording medium that can be printed on by the dot impact printer 10. The optical reader 110 can therefore read the entire surface of any recording medium S that can be used in the dot impact printer 10.

The first scanner 111 and second scanner 112 are disposed on opposite sides of the transportation path P as shown in FIG. 3, but the photosensor line in the first scanner 111 and the photosensor line in the second scanner 112 are offset 5 mm from each other in the transportation direction of the recording medium S. This configuration eliminates the effect of light from one light source on the other photosensor and results in higher scanning quality.

The first scanner 111 and second scanner 112 each have R, G, and B light sources, and can scan in both monochrome (binary, 16 level, 256 level gray scale) and color modes. The scanning resolution of the first scanner 111 and second scanner 112 can be set to one of three levels, 200 dpi (dots/inch), 300 dpi, and 600 dpi. The number of scan lines in the transportation direction of the recording medium S (the secondary scanning direction Y) is set according to the scanning resolution in the main scanning direction, and the conveyance speed of the recording medium S during scanning is adjusted according such parameters as the scanning resolution and how fast the photosensor output signals can be processed.

Figure 4:
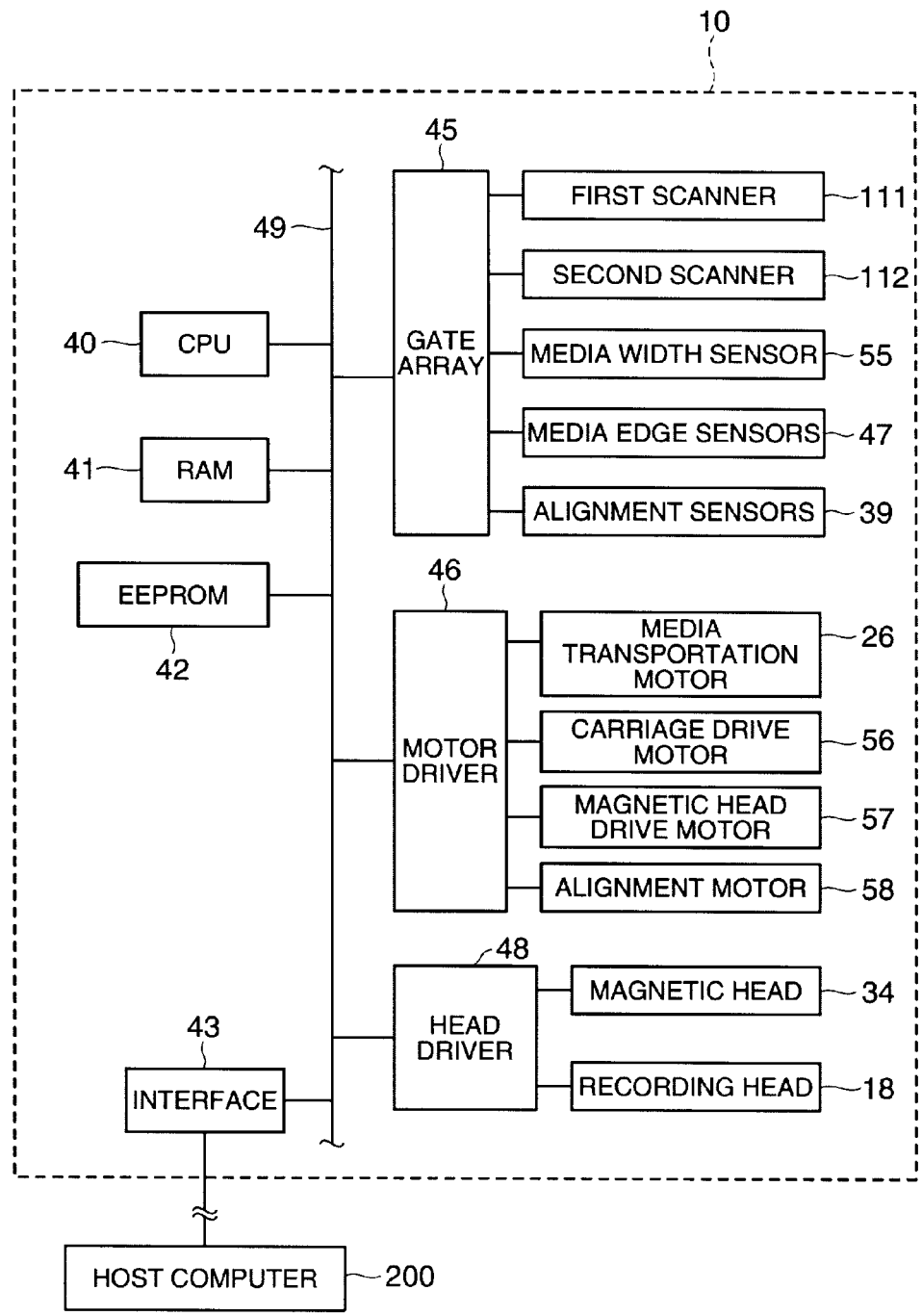
FIG. 4 is a block diagram showing the functional configuration of the dot impact printer.

FIG. 4 is a block diagram showing the control configuration of the dot impact printer 10.

The parts shown in FIG. 4 can be rendered by the cooperation of hardware components disposed to the control circuit board (not shown in the figure) and software.

The dot impact printer 10 includes a CPU 40 as a control unit that controls the dot impact printer 10 based on a control program, RAM 41 that temporarily stores data and a control program read from EEPROM 42 by the CPU 40, EEPROM 42 that stores the control program executed by the CPU 40 and processed data, an interface 43 that converts the data format when communicating information with the host computer 200 that controls the dot impact printer 10, a gate array 45 connected to various sensors, a motor driver 46 that drives motors, a head driver 48 that drives heads, and a bus 49 to which these various parts are connected. Note that a configuration in which the control program is stored on an external recording medium, a reader for the recording medium is disposed to the dot impact printer 10, and the program is read and executed from the recording medium by the CPU 40, is also conceivable.

RAM 41 functions as a temporary storage unit, and renders an image buffer (not shown in the figure) that temporarily stores image data captured by the optical reader 110.

The alignment sensors 39, media edge sensors 47, media width sensor 55, first scanner 111 and second scanner 112 are connected to the gate array 45. The gate array 45 quantizes the analog voltages input from the alignment sensors 39, media edge sensors 47, and media width sensor 55, and outputs the resulting digital data to the CPU 40. The first scanner 111 and second scanner 112 optically read the surface of the recording medium S using a CIS, supply the detection voltages from each pixel of the CIS to the gate array 45, and the gate array 45 quantizes the analog voltages supplied from the first scanner 111 and second scanner 112 and outputs the resulting digital data to the CPU 40.

The motor driver 46 is connected to the media transportation motor 26, carriage drive motor 56, magnetic head drive motor 57, and alignment motor 58, supplies drive current and drive pulses to the motors, and thus causes the motors to operate. Note also that an alignment motor 58 (FIG. 4) for operating the alignment plate 38 (FIG. 3) may also be connected to the motor driver 46.

The media edge sensors 47 are connected to the recording head 18 and magnetic head 34, and supply drive current to the recording head 18 to drive the recording wires to print. The media edge sensors 47 also output drive current for reading and writing to the magnetic head 34, and when reading magnetic data detect and output the detection voltage (analog voltage) from the magnetic head 34 as digital data to the CPU 40.

The CPU 40 acquires detection signals from the sensors and drives the motors to convey the recording medium S by means of the gate array 45, motor driver 46, and head driver 48 based on a control program stored in EEPROM 42, and drives the heads to record on the recording medium S.

The CPU 40 also conveys the recording medium S by means of the media transportation mechanism 100, and reads the surface of the recording medium S by means of the gate array 45 and first scanner 111 and second scanner 112. While scanning, the CPU 40 temporarily stores the data input from the gate array 45 sequentially to a buffer (not shown in the figure) rendered in RAM 41. The CPU 40 also reads and outputs the image data stored in the buffer (not shown in the figure) to the host computer 200 through the interface 43. The CPU 40 and interface 43 together function as a transmission unit at this time.

Figure 5A:
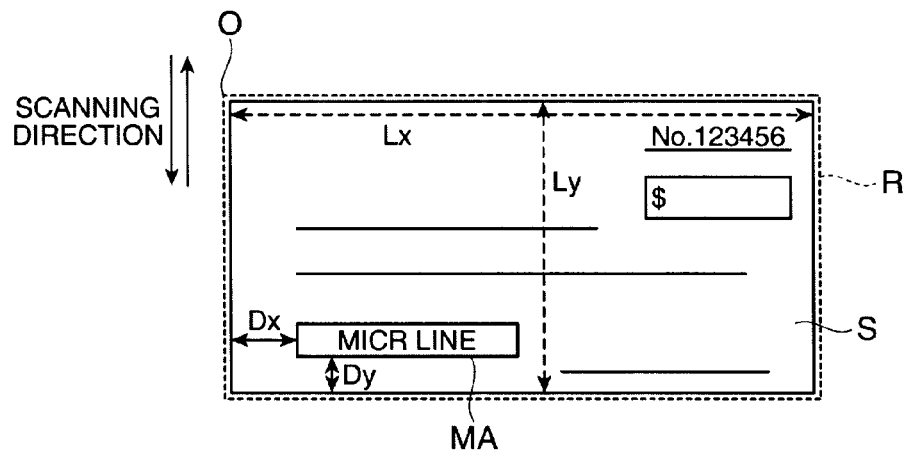
FIGS. 5A and 5B show examples of a scanned medium.
Figure 5B:
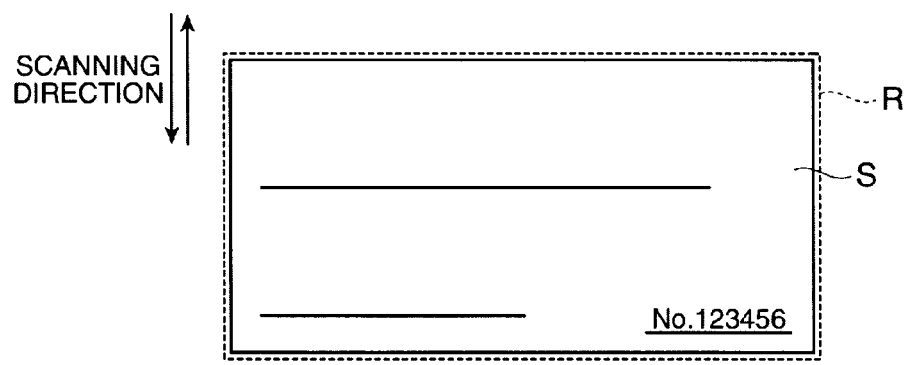

FIG. 5 shows an example of a check as a recording medium S that is processed by the dot impact printer 10. FIG. 5A shows the front and FIG. 5B shows the back of the check.

The check used as the recording medium S is a horizontally long rectangle, is inserted to the dot impact printer 10 with one of the long sides at the leading edge, and is conveyed in the direction of the short side as shown in the figure. Note that the length (width) of the long side of the recording medium S is Lx below, and the length (height) of the short side is Ly.

As shown in FIG. 5A, fields for writing or printing the check serial number, date, check amount, payee, name and address of the payer, and a signature line are provided on the front of the recording medium S, and a MICR area MA where MICR characters are printed is also provided on the bottom left part of the check. As shown in FIG. 5B, the check serial number is printed on the back of the check, and fields for writing or printing the account number and the name of the financial institution on which the check is drawn are also provided. The check serial number may also be printed on the back of the recording medium S.

The recording medium S shown in FIG. 5 is inserted from the manual insertion opening 15 so that the front side shown in FIG. 5A faces down and the back shown in FIG. 5B faces up inside the dot impact printer 10. The front side shown in FIG. 5A is therefore the bottom surface as referred to herein and is read by the second scanner 112, and the back side shown in FIG. 5B is the top surface read by the first scanner 111.

The scanning range R of the first scanner 111 is set according to the size of the recording medium S, and is slightly greater than the width Lx and height Ly of the recording medium S as indicated by the dotted line in FIG. 5A. The width and height of the scanning range R are sized to add a scanning margin to the width Lx and height Ly of the recording medium S, and this scanning margin is typically a few millimeters, for example. The first scanner 111 can therefore optically scan the entire top surface of the recording medium S. The magnetic head 34 also reads the MICR text in the MICR area MA shown in FIG. 5A.

The scanning range R of the second scanner 112 is similarly set according to the size of the recording medium S, and is slightly greater than the width Lx and height Ly of the recording medium S as indicated by the dotted line in FIG. 5B. In this embodiment of the invention the width and height of the scanning range R of the second scanner 112 are the same dimensions as the scanning range R of the first scanner 111, and are sized to add a scanning margin to the width Lx and height Ly of the recording medium S. The second scanner 112 can therefore optically read the entire back side of the recording medium S.

The dot impact printer 10 reads the recording medium S by means of the optical reader 110 while conveying the recording medium S forward or reverse in the direction of the short side. In this case, the direction in which the recording medium S is conveyed while scanning is automatically determined so that scanning the part to be read can be completed with the shortest possible transportation distance as further described below.

Commands are sent from the host computer 200 to the dot impact printer 10 through the interface 43, and the size (Lx, Ly) of the recording medium S to be scanned is set in a command. The CPU 40 identifies the size of the recording medium S based on the command received from the host computer 200 and sets the scanning range R accordingly. Information identifying the location of the MICR area MA on the recording medium S is also contained in the command sent from the host computer 200. The location of the MICR area MA may be specified by the distance Dx from a short side of the recording medium S and the distance Dy from a long side, for example. The CPU 40 controls the motor driver 46 and head driver 48 based on the received command, and drives the magnetic head drive motor 57 to read with the magnetic head 34.

The commands sent from the host computer 200 to the dot impact printer 10 include setup commands, a start scanning (reading) command, and a paper discharge command.

The setup commands are commands for specifying the scanning resolution of the optical reader 110, the scanning side (whether to scan the top or bottom), the scanning direction, the color mode (color or monochrome scanning), the number of gray levels if monochrome scanning is selected, the LED output color if monochrome scanning is selected, and the area to be scanned (scanning area), which defines the area of the image to be captured in the scanning range R. The information used to specify the scanning area could be the coordinates of the start and end points of the area. The coordinates may be coordinates referenced to the left end of the leading end (O) of the scanning range R, for example. After receiving the setup command, the CPU 40 extracts the values specified in the setup command as the settings.

Setting the scanning range R is not limited to using a command sent from the host computer 200. More particularly, pixel data indicating the presence of text or other image data, such as where the brightness of the data values is lower than the data values for the background paper, could be extracted from the image data for the entire surface containing the scanning area of the recording medium S to be scanned, and the scanning range R could be set based on the positions of the detected pixels.

The start scanning command is a command that tells the dot impact printer 10 to start the scanning process. The start scanning command includes information specifying the type of scanning operation, that is, a full scan that reads all of the scanning range R, or a partial scan that reads only the scanning area specified by the setup command. When the CPU 40 receives the start scanning command, it controls the gate array 45 and motor driver 46 to start scanning by the optical reader 110.

The discharge command is a command that specifies whether to discharge the recording medium S from the manual insertion opening 15 or paper exit 20 after scanning is completed, and includes a discharge instruction and information specifying the discharge direction (the manual insertion opening 15 or paper exit 20). When the CPU 40 receives the discharge command, it discharges the recording medium S from the side specified by the discharge command.

A process that sets the scanning direction before the scanning operation starts is described next.

Figure 6:
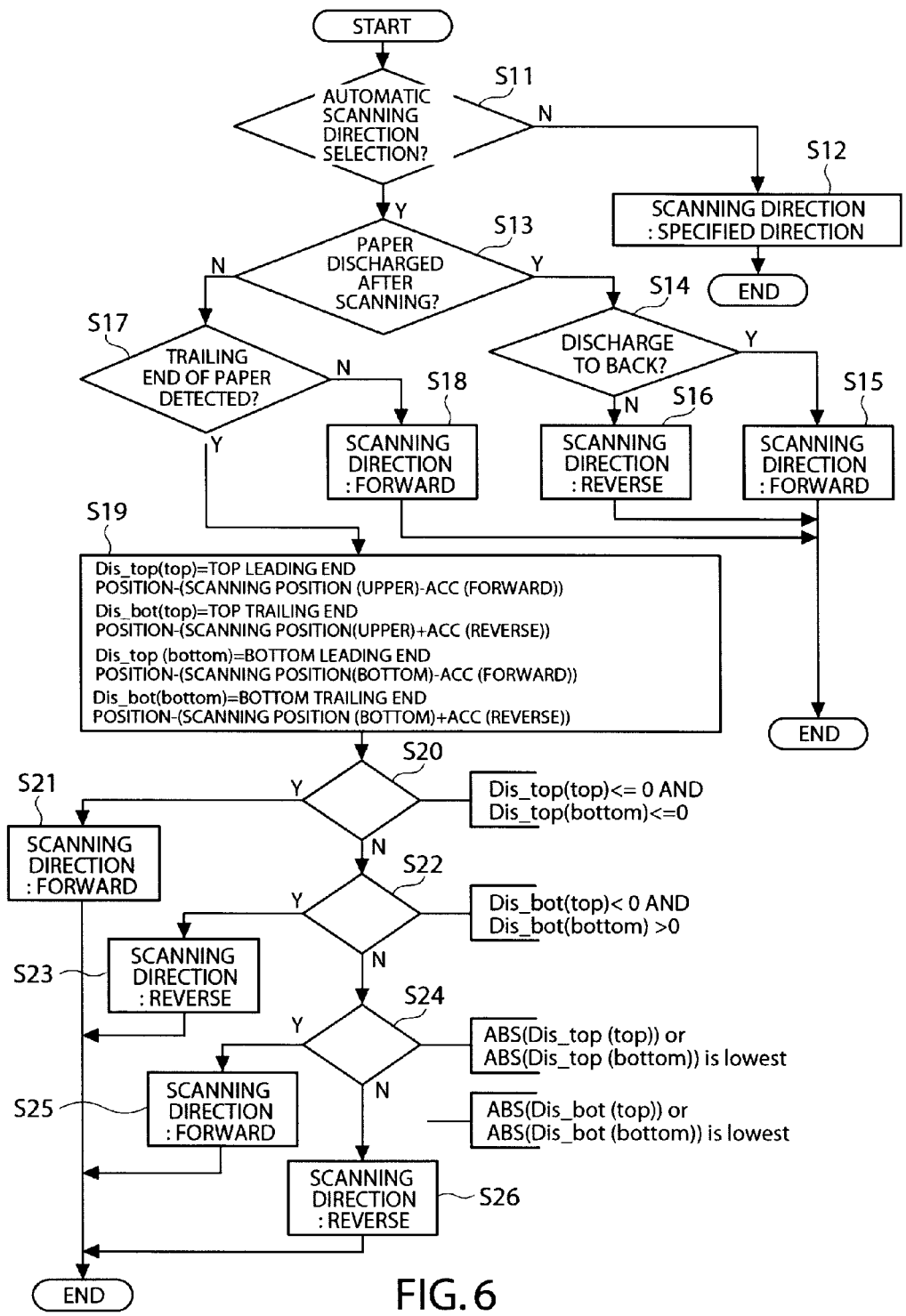
FIG. 6 is a flow chart of the scanning direction setting process.

FIG. 6 is a flow chart of this scanning direction setting process.

Note that a "forward scan" as used herein means scanning while conveying the recording medium S toward paper exit 20 (the normal forward transportation direction), and a "reverse scan" means scanning while conveying the recording medium S toward the manual insertion opening 15 (the reverse transportation direction).

Whether automatic selection of the scanning direction is set is determined first (step S11).

If automatic selection is not set in step S11 (step S11 returns No), scanning proceeds in the specified direction and the scanning direction setting process ends (step S12).

If automatic selection is set in step S11 (step S11 returns Yes), step S13 determines whether or not discharging the paper after scanning is enabled so that the paper discharge process executes after scanning is completed.

If step S13 determines that discharging the paper after scanning is enabled (step S13 returns Yes), the scanning direction is determined by the discharge direction. As a result, whether the discharge direction is to the paper exit 20 (to the back) is determined (step S14).

If step S14 determines that the discharge direction is to the paper exit 20 (to the back) (step S14 returns Yes), the scanning direction is set to the forward direction and the scanning direction setting process ends (step S15) because the medium can be discharged directly to the paper exit 20 (to the back) if the scanning direction is the forward direction.

If step S14 decides that the discharge direction is not to the paper exit 20 (to the back), that is, that the scanning direction is set to the manual insertion opening 15 (to the front) (step S14 returns No), the scanning direction is set to the reverse direction because the medium can be discharged directly to the manual insertion opening 15 (to the front) if the scanning direction is also reverse, and the scanning direction setting process ends (step S16).

However, if discharging the medium after scanning is not enabled in step S13 (step S13 returns No), whether or not the media edge sensors 47 have detected the trailing end of the medium is determined (step S17).

If step S17 determines that the media edge sensors 47 have not detected the trailing end (step S17 returns No), the trailing end detection process must run again in order to scan in the reverse direction. Because this means performing a needless operation, the scanning direction is set to the forward direction and the scanning direction setting process ends (step S18).

Figure 7:
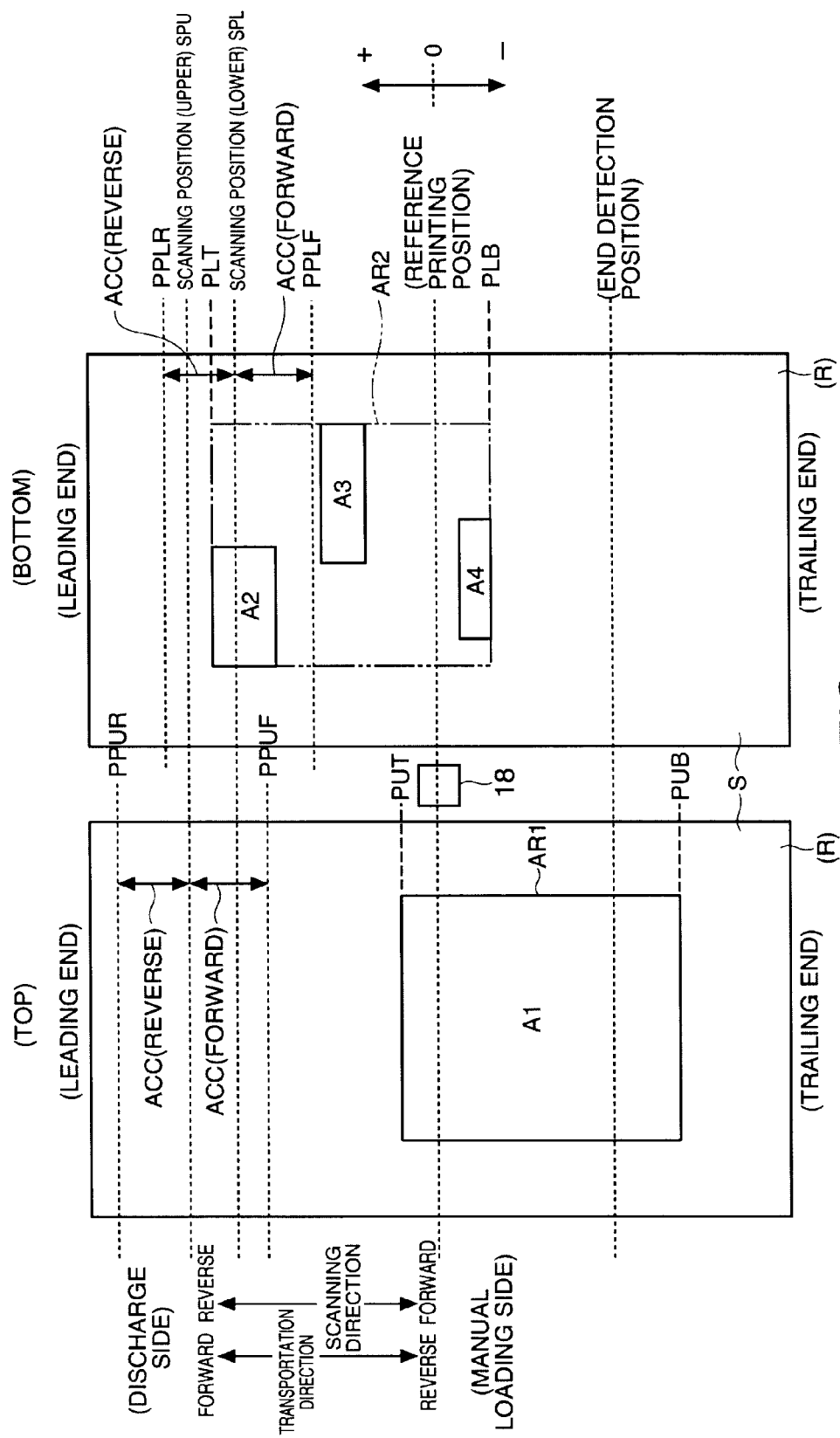
FIG. 7 describes the scanning direction setting process.

FIG. 7 describes the scanning direction setting process. The scanning direction is set in this example to the transportation direction that conveys the recording medium S the shortest distance to finish scanning the recording medium S based on the position of the recording medium S before scanning starts or when scanning starts, and the scanning position of the first scanner 111 or second scanner 112 that is used as the optical reading device. The position of the recording medium S before scanning starts or when scanning starts is equivalent to the position of the recording medium S in the area to be scanned before media transportation starts. The starting point is the left end of the leading end of the recording medium S.

If the trailing end of the medium was already detected by the media edge sensors 47 in step S17 (step S17 returns Yes), the distance Dis_top (top) to the upper scanning preparation position PPUF for a forward scan, the distance Dis_bot (bottom) to the upper scanning preparation position PPUR for a reverse scan, the distance Dis_top (top) to the lower scanning preparation position PPLF for a forward scan, and the distance Dis_bot (bottom) to the lower scanning preparation position PPLR for a reverse scan, are calculated (step S19).

More specifically, the distance Dis_top (top) to the upper scanning preparation position PPUF for a forward scan is defined by the number of steps the media transportation motor 26 is driven when conveying the medium forward. In this configuration the media transportation motor 26 is a stepper motor.

As shown in FIG. 7, the number of steps the media transportation motor 26 is driven is positive (+) toward the paper exit 20 (to the back) and negative (−) toward the manual insertion opening 15 (to the front) referenced to a reference position for printing (a position on the secondary scanning axis of the recording head 18) with the recording head 18.

The distance Dis_top (top) to the upper scanning preparation position PPUF is therefore the top leading end position (top) PUT, which is the leading end of the scanning area on the top side of the paper, minus the scanning position (upper) SPU of the first scanner 111, plus an amount equal to the number of steps ACC (forward) required for the media transportation motor 26 to increase and stabilize the speed of the paper at a specified speed when conveying the paper.

The distance distance Dis_bot (bottom) to the upper scanning preparation position PPUR for a reverse scan is likewise defined by the number of steps the media transportation motor 26 is driven when conveying the medium, and is the bottom leading end position (bottom) PUB, which is the trailing end of the scanning area on the top side of the paper, minus the scanning position (upper) SPU of the first scanner 111, plus an amount equal to the number of steps ACC (reverse) required for the media transportation motor 26 to increase and stabilize the speed of the paper at a specified speed when conveying the paper.

The distance Dis_top (bottom) to the lower scanning preparation position PPLF for a forward scan is likewise defined by the number of steps the media transportation motor 26 is driven to convey the paper, and is the bottom leading end position (bottom) PLT, which is the leading end of the scanning area on the back (bottom) side of the paper, minus the scanning position (lower) SPL of the second scanner 112, plus an amount equal to the number of steps ACC (forward) required for the media transportation motor 26 to increase and stabilize the speed of the paper at a specified speed when conveying the paper.

The distance Dis_bot (bottom) to the lower scanning preparation position PPLR for a reverse scan is likewise defined by the number of steps the media transportation motor is driven to convey the paper, and is the bottom trailing end position (bottom) PLB, which is the trailing end of the scanning area on the back (bottom) side of the paper, minus the scanning position (lower) SPL of the second scanner 112, plus an amount equal to the number of steps ACC (reverse) required for the media transportation motor 26 to increase and stabilize the speed of the paper at a specified speed when conveying the paper.

Whether distance Dis_top (top)<=0 and distance Dis_top (bottom)<=0 is determined next (step S20).

Step S20 determines for both the top and bottom sides of the recording medium S if the leading end of the entire scanning area is on the paper exit 20 side of the first scanner 111 and second scanner 112.

If in step S20 distance Dis_top (top)<=0, and distance Dis_top (bottom)<=0 (step S20 returns Yes), the scanning direction is forward (step S21), and the scanning direction setting process ends.

If in step S20 distance Dis_top (top)>0, or distance Dis_top (bottom)>0 (step S20 returns No), whether distance Dis_bot (top)>0 and distance Dis_bot (bottom)>0 is determined (step S22).

Step S22 determines for both the top and bottom sides of the recording medium S if the leading end of the entire scanning area is on the manual insertion opening 15 side of the first scanner 111 and second scanner 112.

If in step S22 distance Dis_bot (top)>0 and distance Dis_bot (bottom)>0 (step S22 returns Yes), the scanning direction is reverse (step SS23) and the scanning direction setting process ends.

If in step S22 distance Dis_bot (top)<=0 or distance Dis_bot (bottom)<=0 (step S22 returns No), step S24 determines if ABS (distance Dis_top (top)), which is the absolute value of the distance Dis_top (top), or ABS (distance Dis_top (bottom)), which is the absolute value of the distance Dis_top (bottom), is the smallest of the distance Dis_top (top), Dis_top (bottom), distance Dis_bot (top) and distance Dis_bot (bottom) values (step S24).

Step S24 determines which paper feed direction will result in the shortest total conveyance distance when there is a scanning area (such as areas AR1 and AR2 in FIG. 7) on both sides of the scanning position of first scanner 111 or second scanner 112.

If step S24 determines that ABS (distance Dis_top (top)), or ABS (distance Dis_top (bottom)), which is the absolute value of distance Dis_top (bottom), is smallest (step S24 returns Yes), the scanning direction is forward (step S25), and the scanning direction setting process ends.

If step S24 determines that ABS (distance Dis_top (top)), which is the absolute value of distance Dis_top (top), or ABS (distance Dis_top (bottom)), which is the absolute value of distance Dis_top (bottom), is not smallest (step S24 returns No), ABS (distance Dis_bot (top)), which is the absolute value of distance Dis_bot (top), or ABS (distance Dis_bot (bottom)), which is the absolute value of distance Dis_bot (bottom), is the smallest of distance Dis_top (top), Dis_top (bottom), distance Dis_bot (top) and distance Dis_bot (bottom). The scanning direction is therefore set to reverse (step S26), and the scanning direction setting process ends.

The scanning operations of the dot impact printer 10 when conveying the recording medium S forward and when conveying the recording medium S in reverse are described next.

Figure 8A:
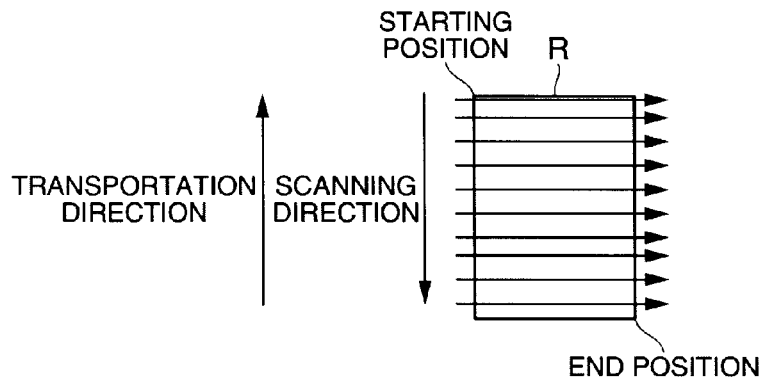
FIGS. 8A, 8B and 8C describe scanning operations using the optical reading device.
Figure 8B:
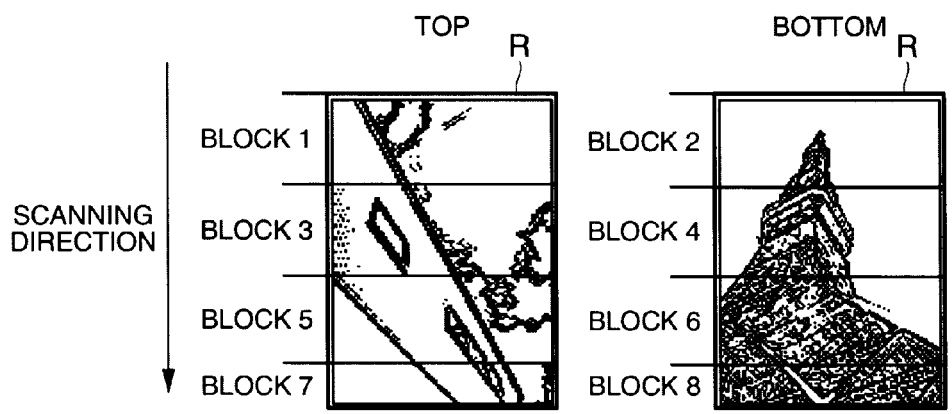
Figure 8C:
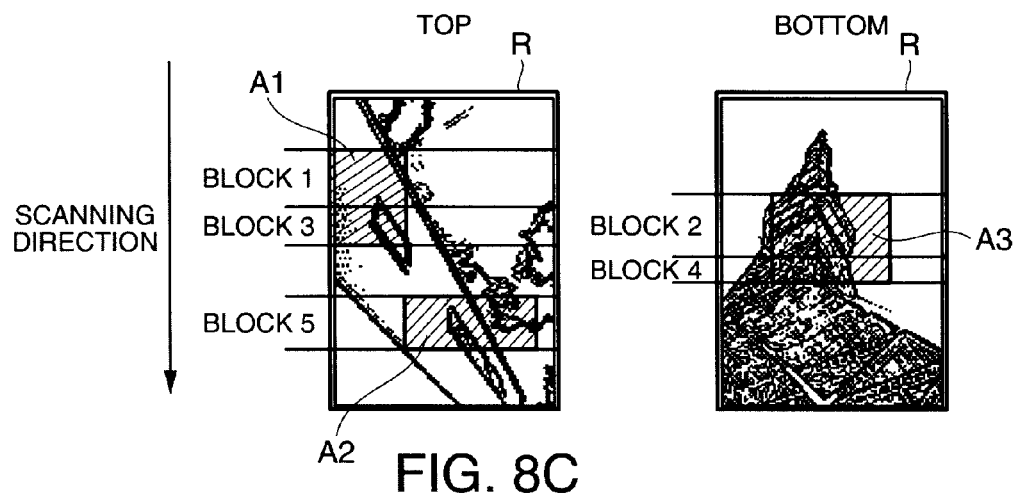

FIG. 8 illustrates the forward scanning operation of the dot impact printer 10. FIG. 8A shows the scanning direction, FIG. 8B schematically describes scanning by the dot impact printer 10 in the full scan mode, and FIG. 8C schematically describes operation in the partial scan mode.

When the dot impact printer 10 scans in the normal (forward) direction, the recording medium S passes the optical reader 110 and is scanned by the first scanner 111 and second scanner 112 while traveling from the front (the left in FIG. 2) of the dot impact printer 10 to the rear (the right in FIG. 2).

In this case, as shown in FIG. 8A, the recording medium S is scanned from the leading end of the scanning range R (the top in the figure) to the trailing end (the bottom in the figure). The image data of the one line scanned by the first scanner 111 and second scanner 112 is output to the gate array 45 line by line sequentially from the left end of the scanning range R. The left end of the leading edge of the scanning range R is therefore the scanning start position, and the right end of the trailing edge is the end position.

When a full scan is indicated by the command sent from the host computer 200, the CPU 40 divides the scanning range R into segments of a predetermined length in the scanning direction (secondary scanning direction Y) as shown in FIG. 8B. These segments are referred to as blocks. The scanning range R of the first scanner 111 and the scanning range R of the second scanner 112 are each segmented into plural blocks of a specified length, and the blocks are sequentially numbered alternately top and bottom from the leading end of the scanning direction. More specifically, the first block of the scanning range R on the top surface is block 1, the first block of the scanning range R on the bottom surface is block 2, and the remaining blocks are similarly numbered alternating top and bottom in the scanning direction 3, 4, ... 8 as shown in the figure. The length of the last block is the length of the block remaining after dividing the scanning range R into blocks of the specified length.

Each block is the size of the process unit in which the image data from the first scanner 111 and second scanner 112 is sent to the host computer 200. That is, each time the image data for one block is stored in the image buffer (not shown in the figure) in RAM 41, the CPU 40 sends the image data for that block to the host computer 200. The specified length, that is, the length of each block in the transportation direction (scanning direction) is determined according to the capacity of the image buffer (not shown in the figure) reserved in RAM 41. For example, if the image buffer has sufficient capacity to store 300 lines of full-color image data at the maximum resolution of 600 dpi, the length of one block is set appropriately to a length of 300 lines or less.

When scanning in the full scan mode, the CPU 40 controls the motor driver 46 to drive the media transportation motor 26 to convey the recording medium S at a specified speed while controlling the gate array 45 and driving the light sources of the first scanner 111 and second scanner 112 to generate the scanned image data based on the detection values from the photosensors and storing the scanned image data line by line to the image buffer in RAM 41.

The CPU 40 continues this operation without interrupting conveying the recording medium S until the entire scanning range R is read by the first scanner 111 and second scanner 112. When scanning any block is completed during this operation and the image data for one block is stored in the image buffer in RAM 41, the CPU 40 reads and sends the image data for that block from the image buffer to the host computer 200, and then deletes the scanned image data from the image buffer after transmission is completed. Deleting the scanned image data creates a large empty storage space in the image buffer again so that the scanned image data captured next can be stored.

Each time scanning one block is completed, the CPU 40 sends the captured image data to the host computer 200 as described above. Note that the order in which the image data captured from each block is sent is the order in which scanning is completed, and is not limited to the order of the block numbers.

When the CPU 40 sends the scanned image data to the host computer 200, it also sends additional information in a header indicating which side was scanned (top or bottom), the size of the scanned block, the block number, and the data length. If the amount of image data is large, the CPU 40 can send the image data for one block in smaller segments, in which case information enabling the host computer 200 to rejoin the image data segments may also be added to the header.

When the command received from the host computer 200 specifies a partial scan, the CPU 40 sets the area to be scanned according to the scanning area specified in the scanning range R by the setup command as shown in FIG. 8C. In the example shown in FIG. 8C, areas A1 and A2 are set in the scanning range R of the top, and area A3 is set in the scanning range R on the bottom side of the recording medium S.

The CPU 40 configures the scan blocks according to the arrangement of the areas to be scanned. If the length of an area in the scanning direction is shorter than the predetermined length of one block described above, the CPU 40 produces one block for the one area. The leading end and the trailing end of this block match the leading end and trailing end of the area. If the length of the area is greater than the predetermined block length, the CPU 40 segments the scanning area into blocks of the specified length starting from the leading end of the area in the scanning direction. In the example shown in FIG. 8C, areas A1 and A3 exceed the predetermined block length, and area A1 is therefore divided into blocks 1 and 3, and area A3 is divided into blocks 2 and 4. The block numbers are assigned sequentially from the leading end of each block alternating top and bottom in the same way as in the full scan mode.

Note that when there are plural scan areas defined across the width of the scanning range R, and the areas overlap in the scanning direction, all of the overlapping areas are treated as a single block. If the length of such a block in the scanning direction exceeds the maximum length of one block, the block is segmented into plural blocks in the scanning direction.

The CPU 40 then starts scanning areas A1 to A3 in the scanning range R. The CPU 40 controls the gate array 45 and motor driver 46 and continues the scanning operation without interrupting transportation of the recording medium S until all areas have been scanned by the first scanner 111 and second scanner 112. When reading any block is completed and the image data for that block is stored in the image buffer in RAM 41 during this operation, the CPU 40 reads and sends the image data for that block from the image buffer to the host computer 200, and then deletes the image data from the image buffer after data transmission is completed. The transmission sequence in this case is the same as during the full scan mode, that is, in the order in which scanning is completed and is not limited to the order of the block numbers.

When the CPU 40 sends the scanned image data to the host computer 200, it also sends additional information in a header indicating which side was scanned (top or bottom), the size of the scanned block, the block number, the data length, the area number, and the coordinates of the beginning and end positions of the area. If a single area is divided into plural blocks, information for rejoining the blocks constituting each area may also be included. In addition, if plural areas are contained in one block, the CPU 40 divides the scanned image data for the block into the individual areas, and sends the image data for each area to the host computer 200. If the size of the captured image data is large, the data can also be divided into smaller units for transmission to the host computer 200 in this partial scan mode.

The host computer 200 receives the scanned image data sent from the dot impact printer 10, and reconstructs the scanned image block by block. In addition, when the host computer 200 specifies the full scan mode in the setup command sent to the dot impact printer 10, it reproduces images for the entire scanning range R of both the top and bottom sides by rejoining the blocks. In addition, when the partial scan mode is specified by the setup command, the host computer 200 reproduces the scanned image data for each area by rejoining the blocks when a single area is divided into plural blocks, and using the scanned image data contained in each block as is when a single block constitutes a single area.

Figure 9A:
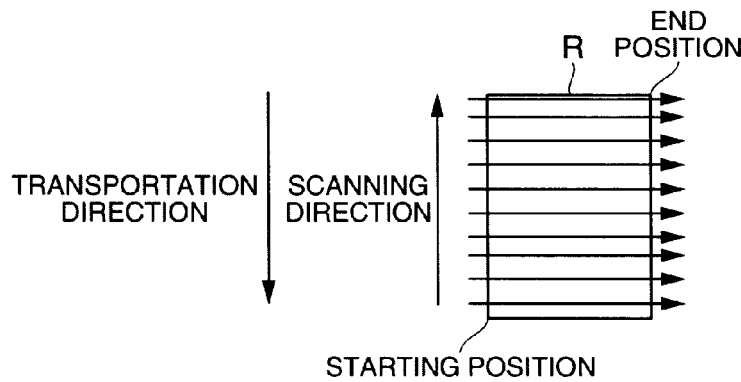
FIGS. 9A, 9B and 9C describe scanning operations using the optical reading device.
Figure 9B:
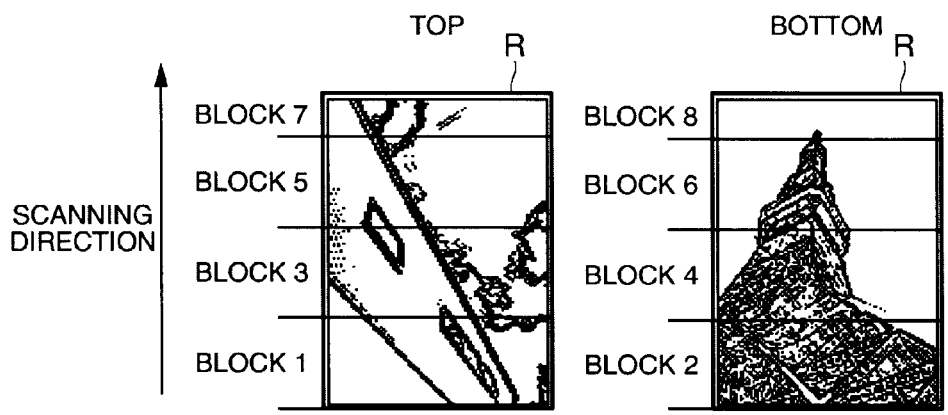

FIG. 9 illustrates the reverse scanning operation of the dot impact printer 10. FIG. 9A shows the scanning direction, FIG. 9B schematically describes scanning in the full scan mode, and FIG. 6C schematically describes operation in the partial scan mode.

When the dot impact printer 10 scans in the reverse direction, the recording medium S passes the optical reader 110 and is scanned by the first scanner 111 and second scanner 112 while traveling from the rear of the dot impact printer 10 to the front. In this case scanning proceeds from the trailing end of the scanning range R as shown in FIG. 9A (the bottom end in the figure) to the leading end (the top end in the figure). Because the scanned image of one line captured by the first scanner 111 and second scanner 112 is output sequentially from the left end (the base of the arrow) to the right end (the tip of the arrow) of the scanning range R through the gate array 45 one line at a time, the left end of trailing edge of the scanning range R is the scanning start position and the right edge of the leading end is the end position.

When scanning in reverse in the full scan mode, the scanning range R is segmented into blocks from the trailing end as shown in FIG. 9B. The block numbers are assigned sequentially from the end at the leading edge during scanning while alternating top and bottom. Other aspects of the operation are the same as during a full scan in the forward direction.

Figure 9C:
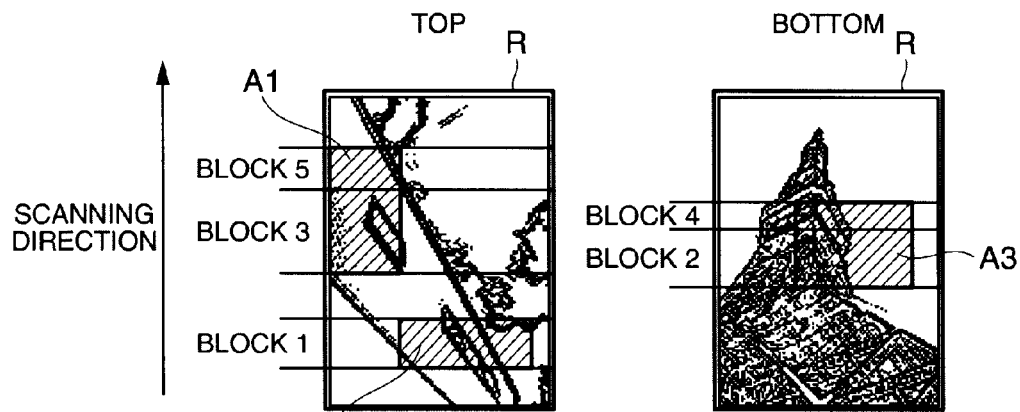

When scanning in reverse in the partial scan mode, the areas to be scanned are configured based on the setup command received from the host computer 200 as shown in FIG. 9C, and the areas are segmented into blocks from the trailing end of the scanning range R, which is the leading end in the scanning direction. Areas that exceed the maximum length of one block are divided into blocks of the specified length referenced to the trailing end of the scanning range R. Other aspects of the operation are the same as during a partial scan in the forward direction.

The top and bottom of the scanned image data captured in the reverse direction is inverted from the image data captured when scanning forward. As a result, the CPU 40 of the dot impact printer 10 may execute a process to rotate the image data before transmission to the paper exit 20, but because the host computer 200 that sent the setup command has information about the scanning direction, the host computer 200 can use this information to invert the top and bottom of the scanned image data.

Figure 10:
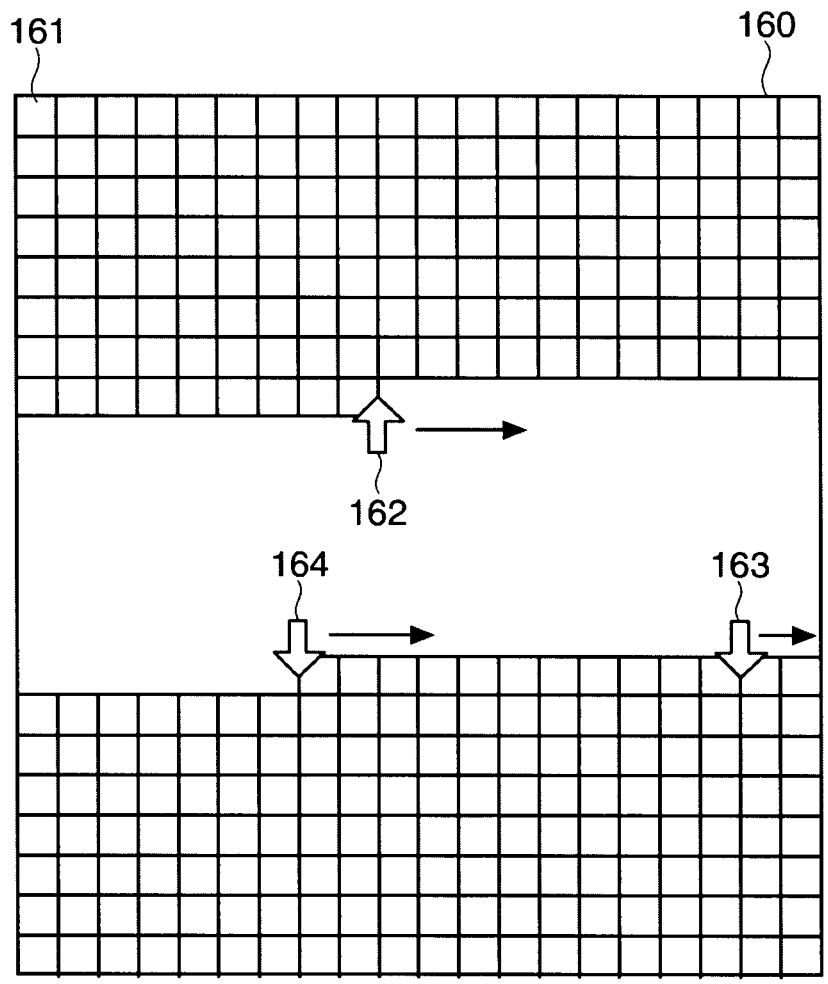
FIG. 10 schematically describes the configuration of a scanning buffer rendered in RAM.

FIG. 10 schematically describes the configuration of the scan buffer 160 rendered in RAM 41.

The scan buffer 160 shown in FIG. 10 is rendered by reserving space in RAM 41. The scanned image data that is captured by the first scanner 111 and second scanner 112 and then digitized by the gate array 45 is stored in the scan buffer 160.

As shown in FIG. 10, the scan buffer 160 is configured as a ring buffer, and the CPU 40 writes data 161 while cycling the write pointer 162 through the scan buffer 160. The CPU 40 reads the data 161 written to the scan buffer 160 while moving the read pointer 163 through the scan buffer 160, and sequentially sends the scanned image data read from the scan buffer 160 to the host computer 200. The CPU 40 then sequentially deletes the transmitted data 161 while moving the delete pointer 164. As a result, storage space is released in the scan buffer 160 while the scanned image data is read and transmitted.

If sending the scanned image data to the host computer 200 is delayed, the scan buffer 160 runs out of available storage space, the CPU 40 cannot write the scanned image data to the scan buffer 160, and the first scanner 111 and second scanner 112 must stop scanning. When this happens the CPU 40 causes the media transportation mechanism 100 to stop conveying the recording medium S. As a result, the CPU 40 quickly releases storage space in the scan buffer 160 so that scanning can proceed smoothly without interruption by determining the transmission sequence of each area as described below and quickly sending the scanned image data stored in the scan buffer 160 to the host computer 200.

Figure 11:
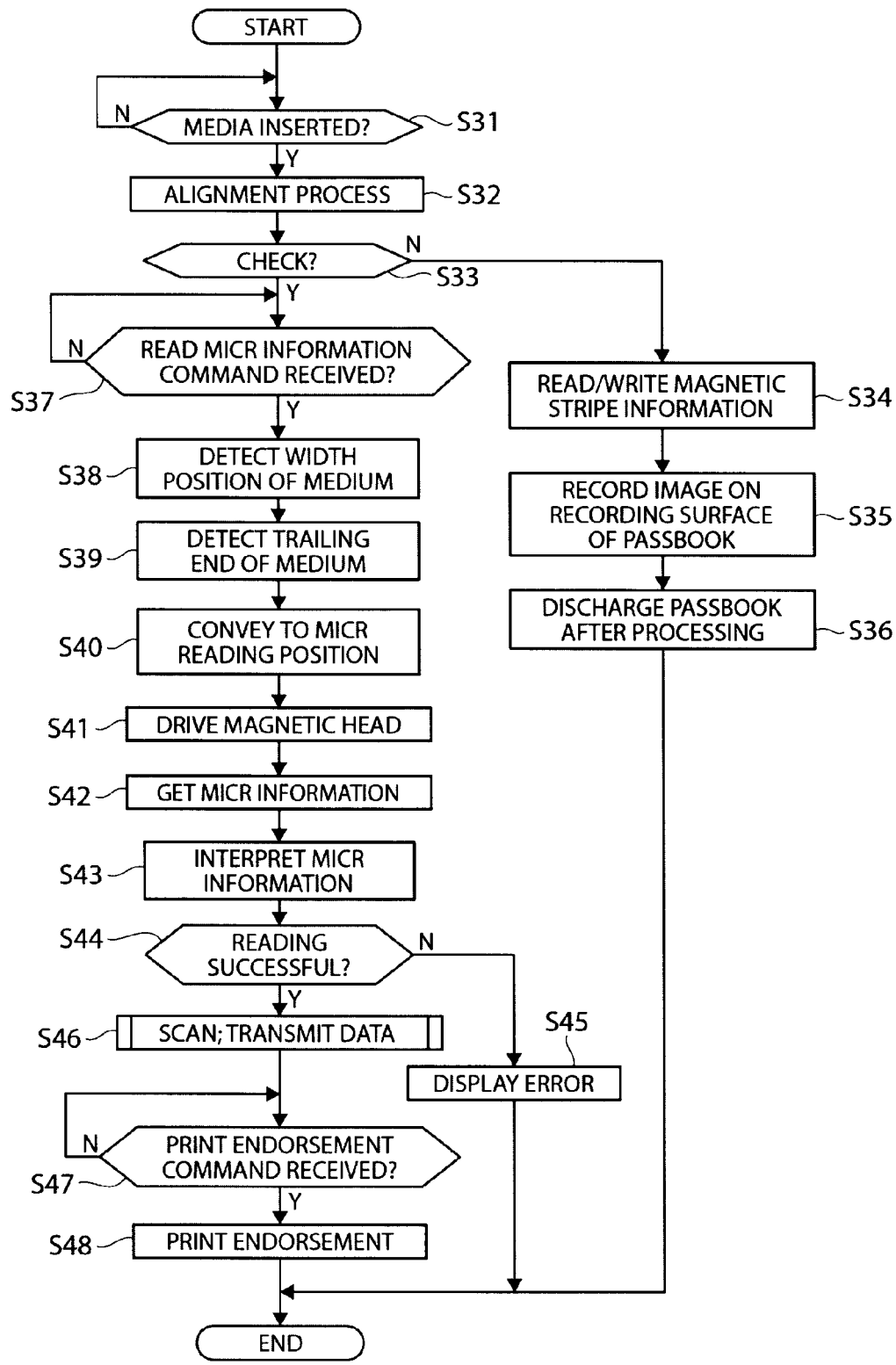
FIG. 11 is a flow chart of the operation of the dot impact printer.

FIG. 11 is a flow chart describing the operation of the dot impact printer 10 according to this embodiment of the invention.

When a recording medium S is inserted to the manual insertion opening 15 and the media edge sensors 47 detect the leading end of the recording medium S (step S31 returns Yes), the CPU 40 of the dot impact printer 10 drives the alignment plate 38 to protrude into the transportation path P of the recording medium S and operates the media transportation motor 26 to align the recording medium S (step S32).

The CPU 40 then determines whether the detected recording medium S is a check or a passbook (step S33).

The CPU 40 can determine the type of recording medium S based on information acquired from the host computer 200. Alternatively, the CPU 40 can detect the locations of the leading end and side of the recording medium S using the media edge sensors 47 and media width sensor 55, and determine the type of recording medium S based on this position and size information. Further alternatively, based on the positions of the leading end and side of the recording medium S detected using the media edge sensors 47 and media width sensor 55, the CPU 40 may attempt to read the MICR information using the magnetic head 34, and determine the type of recording medium S by determining whether or not MICR information is found in the MICR area MA by this reading attempt. In this embodiment of the invention the CPU 40 acquires from the host computer 200 information identifying the type of recording medium S (check or passbook), information such as the size of the check if the recording medium S is a check, information about the location of the MICR area MA, and information about the transportation distance, and determines based on the received information whether the recording medium S is a check or a passbook.

If the decision of step S33 is that the recording medium S is not a check (step S33 returns No) and the CPU 40 determines that the recording medium S is a passbook, for example, it conveys the recording medium S to the position where the magnetic stripe on the passbook can be read by the magnetic head 34, and then reads and/or writes the magnetic stripe by means of the magnetic head 34 (step S34).

The CPU 40 then conveys the recording medium S to the position of the recording head 18, records on the recording surface by means of the recording head 18 (step S35), and then discharges the recording medium S from the manual insertion opening 15 (step S36) to complete the process.

If the decision of step S33 is that the recording medium S is a check (step S33 returns Yes), the CPU 40 determines if a MICR information read command was received from the host computer 200 (step S37).

If the decision of step S37 is that a MICR read command was received (step S37 returns Yes), the CPU 40 retracts the alignment plate 38 from the transportation path P, and conveys the recording medium S by means of the media transportation mechanism 100 until at least the leading end of the recording medium S is directly below the media width sensor 55. The CPU 40 then drives the carriage drive motor 56 (FIG. 5) to move the carriage 19 in the main scanning direction, and detects the widthwise position of the recording medium S based on the output signals from the media width sensor 55 and the position of the carriage 19 in the main scanning direction (step S38).

The CPU 40 also monitors the output signal from the media edge sensors 47 while conveying the recording medium S by means of the media transportation mechanism 100, and detects the trailing end of the recording medium S (step S39).

The CPU 40 then conveys the recording medium S by means of the media transportation mechanism 100 to the position where the MICR area MA can be read by the magnetic head 34 (step S40), controls the motor driver 46 to operate the magnetic head drive motor 57, and reads the MICR text in the MICR area MA by means of the magnetic head 34 (step S41).

The MICR information read by the magnetic head 34 is then digitized by the gate array 45, and the CPU 40 acquires the output digital data (step S42), and interprets the character data based on the digital data and converts it to text information (step S43). Whether or not the number of uninterpretable characters in the extracted text exceeds a predetermined number is then determined (step S44).

If the number of characters exceeds the predetermined count (step S44 returns No), the CPU 40 outputs an error and discharges the recording medium S (step S45), and ends operation. The error can be reported in step S45 using a display unit disposed to the dot impact printer 10, sending information indicating that an error occurred to the host computer 200, or using both methods.

If the decision of step S44 is that the number of uninterpretable characters does not exceed the preset count and reading was successful (step S44 returns Yes), the CPU 40 scans the recording medium S using the optical reader 110 and sends the captured image data to the host computer 200 (step S46).

The CPU 40 then waits to receive a command to print on the back from the host computer 200 (step S47). When a back print command is received (step S47 returns Yes), the CPU 40 reverses the media transportation motor 26 to convey the recording medium S to below the recording head 18, and then drives the carriage drive motor 56 and recording head 18 to print an endorsement indicating that the check was processed on the back of the recording medium S (step S48). When printing the endorsement is completed, the CPU 40 drives the media transportation motor 26 again to discharge the recording medium S from the manual insertion opening 15 or the paper exit 20.

Figure 12:
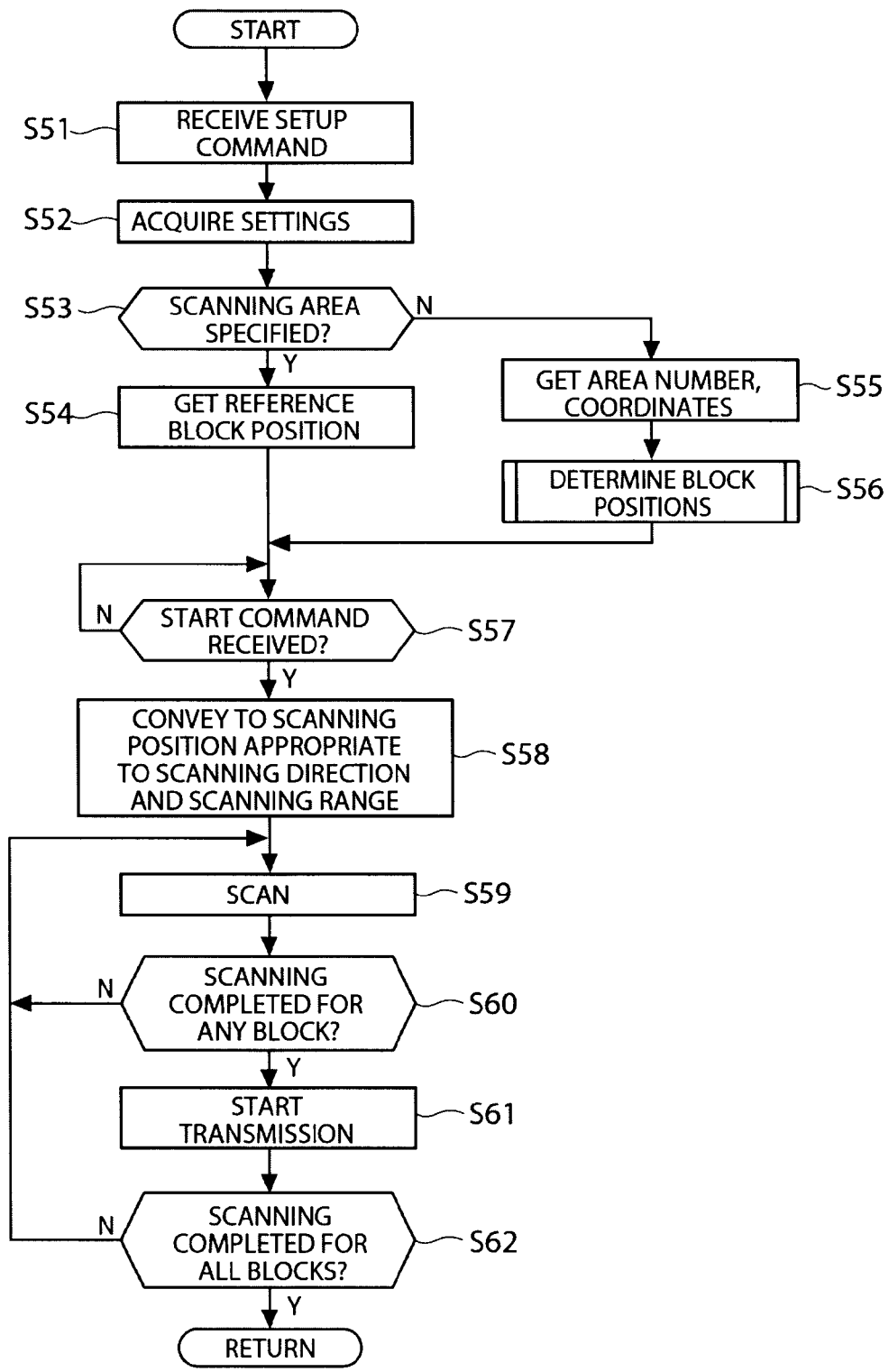
FIG. 12 is a flow chart of the operation of the dot impact printer.

FIG. 12 is a flow chart of the scanning operation executed by the dot impact printer 10, and describes the operation executed in step S46 in FIG. 11 in further detail.

The CPU 40 receives the setup command sent from the host computer 200 (step S51), and acquires the settings specified by the setup command (step S52).

The CPU 40 determines whether to operate in the full scan mode for scanning all of the recording medium S, or the partial scan mode for scanning a specified portion of the recording medium S (step S53). If a full scan is performed (step S53 returns Yes), the CPU 40 gets the position of the block referenced to scan the entire scanning range R based on the scanning direction specified in the setup command (step S54), and goes to step S57. The position of the reference block used for a full scan of the scanning range R is stored in EEPROM 42, for example.

If a particular area set within the scannable area of the optical reader 110 is to be scanned (step S53 returns No), the CPU 40 acquires or generates the number of areas to be scanned, the area numbers and the coordinates of the start and end positions of each area, and identifies the scanning areas in the scanning range R (step S55). For each area located in the scanning range R, the CPU 40 determines the positions of the blocks of each area based on the scanning direction specified in the setup command.

The CPU 40 then determines the transmission order of the scanned image data for each area as described below (step S56), and proceeds to step S57.

In step S57, the CPU 40 waits to receive a start scanning command from the host computer 200, and when a start scanning command is received (step S57 returns Yes), the CPU 40 conveys the recording medium S to the scanning start position of the optical reader 110 by means of the media transportation mechanism 100 in the direction of the shortest transportation distance based on the scanning direction specified in the setup command, whether a full scan or partial scan is specified, the position of the specified area if a partial scan is specified, and the current position of the recording medium S (step S58).

The CPU 40 then scans while conveying the recording medium S by means of the first scanner 111 and second scanner 112 (step S59).

While scanning proceeds, the CPU 40 determines if there is a block for which scanning is completed (step S60). If there is a block for which scanning is completed (step S60 returns Yes), the CPU 40 starts the process of reading and sending the image data captured for that block from the image buffer in RAM 41 to the host computer 200 (step S61), and then deletes the image data for that block from the image buffer after data transmission is completed. The CPU 40 the determines if scanning all blocks is finished (step S62).

The CPU 40 then determines if scanning all blocks was completed (step S62). If the decision of step S62 is that there is a block for which scanning is not completed (step S62 returns No), the CPU 40 returns to step S59, continues scanning, and if a new block for which scanning is completed is detected, sends the image data for that block to the host computer 200.

If the decision of step S62 is that scanning all blocks in the scanning range R of both top and bottom sides is completed (step S62 returns Yes), the CPU 40 stops the scanning operation.

As described above the photosensors of the first scanner 111 and second scanner 112 are offset from each other with the first scanner 111 positioned approximately 5 mm in front in this embodiment of the invention. As a result, scanning the scanning range R on the top side is completed before the scanning range R on the bottom is completed when scanning in the forward direction, and when scanning in reverse scanning the scanning range Ron the bottom is completed before scanning the scanning range R on the top is completed.

Figure 13:
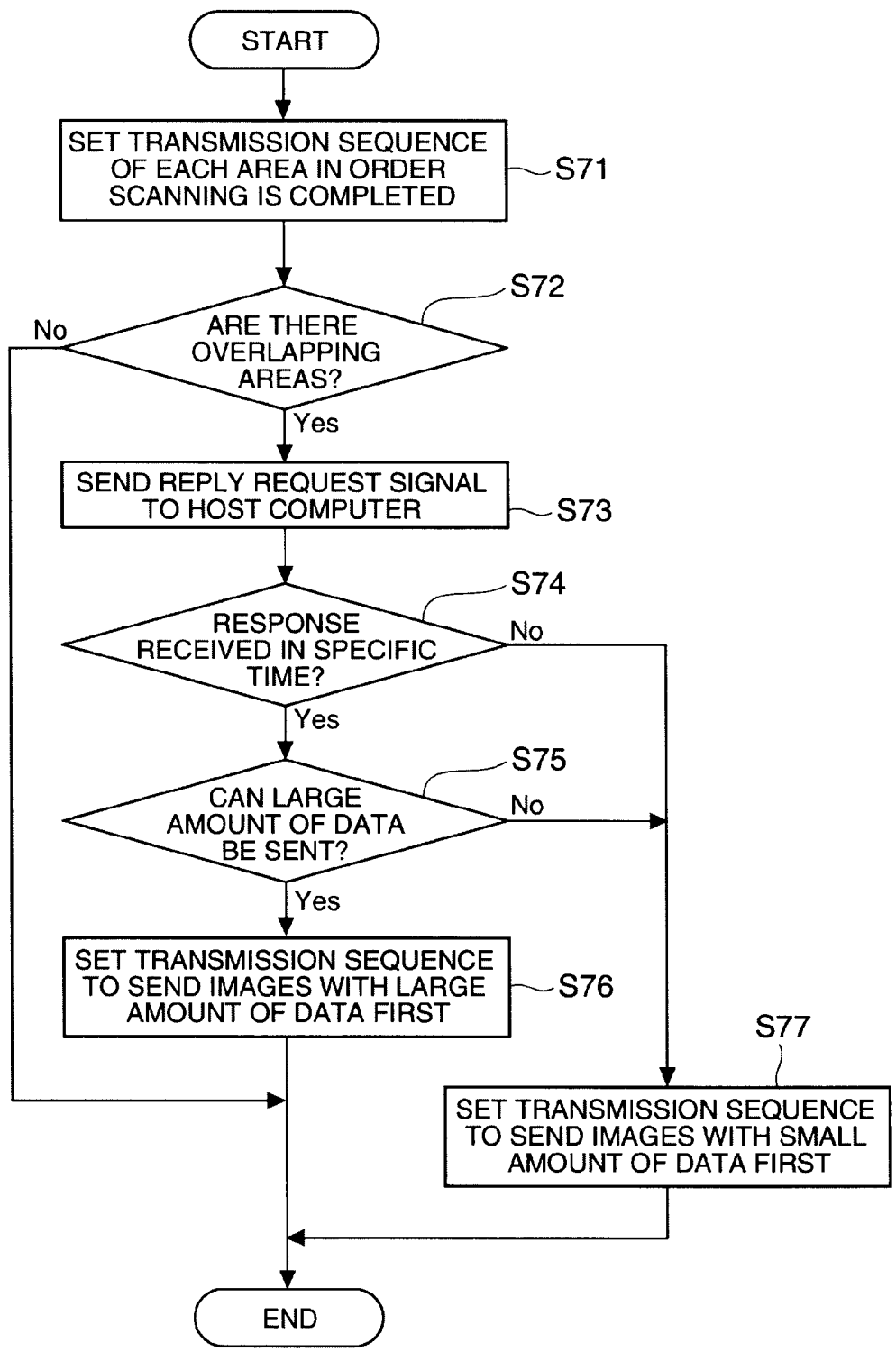
FIG. 13 is a flow chart of the operation of the dot impact printer.

FIG. 13 is a flow chart of the scanning operation executed by the dot impact printer 10, and describes the operation performed in step S56 in FIG. 12 in greater detail.

The CPU 40 of the dot impact printer 10 has already determined the numbers and the positions (starting position and end position) of all areas to be scanned in the scanning ranges R on both sides of the recording medium S before the process shown in FIG. 13.

The CPU 40 first determines the transmission sequence so that each of the defined areas is transmitted in the order in which scanning is completed (step S71).

The CPU 40 then determines if there are any areas with overlapping positions (step S72). Overlapping areas as used herein means plural areas that overlap partially or completely in the transportation direction (scanning direction). If there are overlapping areas (step S72 returns Yes), the CPU 40 sends a reply request signal through the interface 43 to the host computer 200 (step S73).

A reply request signal is a signal that asks the host computer 200 if it is ready to receive a large amount of scanned image data, and a previously defined command can be used. A large amount of data is determined based on a preset standard.

The CPU 40 waits for a response to the reply request signal from the host computer 200 (step S74), and determines if a response to the reply request signal from the host computer 200 is received within a predetermined time after the reply request signal was sent. Whether or not a response from the host computer 200 was received can alternatively be determined from the length of time until the response was received from the host computer 200, or the interval between responses. That a large amount of scanned image data can be received could alternatively be determined by detecting that the period in which the host computer 200 can receive data (the ready state) is long. Further alternatively, that a large amount of scanned image data cannot be received could be determined by detecting that the period in which the host computer 200 cannot receive data (the busy state) is long.

If a response from the host computer 200 is received within the specified time (step S74 returns Yes), the CPU 40 determines if the host computer 200 can receive a large amount of data based on the response (step S75).

If the host computer 200 can receive a large amount of data (step S75 returns Yes), the CPU 40 determines the transmission sequence of plural overlapping areas so that the largest amounts of data are sent first (step S76). Step S76 determines the transmission sequence of the overlapping areas in the transmission sequence determined in step S71. If there are no overlapping areas (step S72 returns No), the CPU 40 confirms the transmission sequence set in step S71 and ends this process.

If data is sequentially sent to the host computer 200 from large to small based on the size of the scanned image data, the scanned image data that occupies the most space in the scan buffer 160 will be transmitted quickly and can be deleted. Because storage space is quickly released in the scan buffer 160, the next scanned image data, for example, can be written. Problems such as interruption of the recording medium S scanning operation due to a lack of empty storage space in the scan buffer 160 can therefore be avoided and improved throughput can be expected.

There are situations in which the host computer 200 cannot receive large amount of data because the host computer 200 is executing a different process or communicating with a different device and the communication interface (not shown in the figure) of the host computer 200 is busy. In this situation, that is, it is determined that the host computer 200 cannot receive a large amount of data (step S75 returns No), the CPU 40 determines the transmission sequence of the plural overlapping areas so that the scanned image data is sent sequentially from the smallest image data (step S77). Step S77 determines the transmission sequence of the overlapping areas in the transmission sequence determined in step S71.

If a response to the reply request signal sent by the dot impact printer 10 is not received within the specified time (step S74 returns No), the CPU 40 determines that the host computer 200 cannot receive a large amount of data and goes to step S77.

When the scanned image data is sent to the host computer 200 in order from small to large, problems are unlikely even if the communication speed between the dot impact printer 10 and host computer 200 is slow. If the host computer 200 becomes busy while scanned image data is being sent, the dot impact printer 10 must wait for the host computer 200 to return. However, if the size of the image data being sent is small, there is less waiting for recovery, and improved throughput can be expected as a result. Communication errors also increase if there is frequent switching between busy and wait states. Control to resume data transmission is also required every time an error occurs, which increases overhead and reduces efficiency. However, if the scanned image data is transmitted in order from small to large image data, communication errors can be reduced and improved efficiency transmitting scanned image data can be expected.

In the operation shown in FIG. 13, the transmission order of plural areas in the scanning range R is set to the order in which scanning each area is completed, and the transmission sequence of overlapping areas is then determined based on the state of the host computer 200, but the invention is not so limited. For example, the transmission sequence of all areas set in the scanning range R may be set from large to small or small to large according to the size of the scanned image data based on the state of the host computer 200. In this configuration steps S71 and S72 described above are omitted, and the transmission sequence of all areas is set in steps S76 and S77.

The transmission sequence can also be set individually for areas in the scanning range R on the front of the recording medium S and areas in the scanning range R on the back of the recording medium S. More specifically, the transmission sequence of areas in the scanning range R on the front can be set independently of the transmission sequence of areas in the scanning range R on the back. This method is particularly useful when image data from areas in the scanning range R on the front and image data from areas in the scanning range R on the back are stored to separate areas in the scan buffer 160, or when separate scan buffers 160 are provided for the front scanning range R and the back scanning range R.

Further alternatively, when there are plural areas to be scanned in the scanning range R, the transmission sequence could be set to the order in which scanning starts.

In the operation shown in FIG. 13, the process could also end after only setting the the transmission sequence for all areas in step S71. If there are areas for which scanning starts or stops simultaneously, the transmission sequence can be set based on whether the coordinates of the start position or end position come first or last.

The transmission sequence of all areas could further alternatively be set from large to small according to the size of the scanned image data, for example, in step S71 instead of the start scanning sequence or stop scanning sequence of the areas. The scanned image data occupying the largest percentage of the scan buffer 160 is thus transmitted first and can then be erased with this method, which is particularly useful when the capacity of the scan buffer 160 is small compared with the total size of the scanned image data from the scanning range R or the average size of the scanned image data in each area. As a result, interruptions caused by insufficient storage capacity in the scan buffer 160 can be effectively prevented.

Any desirable method can be used for the CPU 40 to evaluate the relative size of the scanned image data for each area. The size can be calculated from the coordinates of the scanning start position and end position, for example, but simpler methods can also be used.

Figure 14:
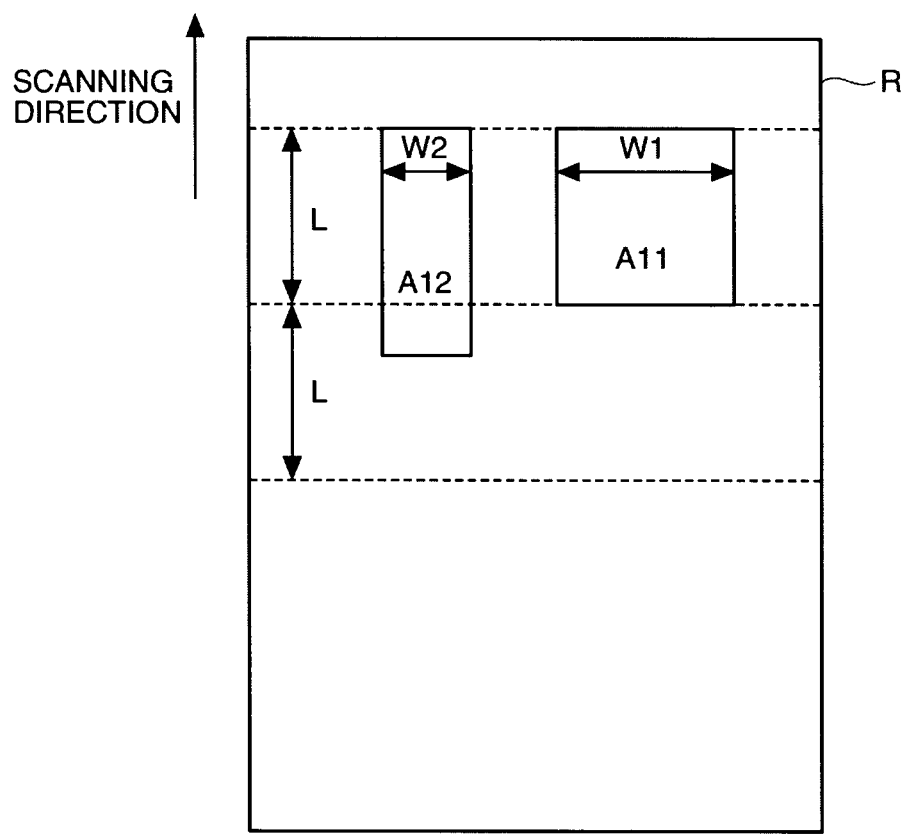
FIG. 14 describes a method of determining the scanned data transmission sequence.

FIG. 14 describes a method of evaluating the relative size of the scanned image data.

An example of one method of determining the relative size of plural areas A11 and A12 in the scanning range R is described in FIG. 14. The CPU 40 compares the width W11 (the direction perpendicular to the scanning direction) of area A11 and the width W12 of area A12, and determines the relative size of the scanned image data from each area based on the width of each area. In this example area A11 is larger than area A12. In this example areas A11 and A12 are different sizes in the scanning direction (transportation direction). Because areas that are large in the scanning direction are segmented into plural blocks as described above, however, the maximum length of the scanned image data transmitted at one time is limited to the length L of the block. The size of the scanned image data can therefore be determined based on the width of each area without significant error, and this method is therefore particularly useful because the load of the operating process required to determine the size can be greatly reduced. The block length L may be a specific communication unit, or a memory storage unit, such as a sector in the scan buffer 160, for example.

When transmitting the scanned image data for each area set in the scanning range R according to the transmission sequence determined as described above, areas that are segmented into plural blocks are transmitted by sending the image data for each area according to the determined transmission sequence, pausing image data transmission at the block boundary, and then restarting transmission for the next block.

Further alternatively, before the transmission sequence is determined in step S55 (FIG. 12), the scanning areas set in the scanning range R could be segmented into blocks, an area number assigned to each of the blocks as a separate area, and the transmission sequence of each area then determined.

The method of identifying the areas to be scanned in step S55 (FIG. 12) could specify the areas by means of a setup command sent from the host computer 200 to the dot impact printer 10 as described above. Alternatively, a method in which the dot impact printer 10 determines the scanning areas is also conceivable.

For example, the CPU 40 could control the media transportation mechanism 100 and optical reader 110 to pre-scan the entire recording medium S by means of the optical reader 110, and then determine the scanning areas based on the result of this pre-scan. This pre-scan compares the digitized output values of the optical reader 110 supplied from the gate array 45 with a predetermined threshold value pixel by pixel, and stores information identifying the position of each pixel that exceeds the threshold value in the scan buffer 160. Based on the data stored in the scan buffer 160, the CPU 40 identifies the places where there is a symbol, text, or other marking to be read, and sets an area containing that place as an area to be scanned.

Because the amount of information required to identify the locations of pixels exceeding the threshold value is significantly smaller than the actual scanned image data, all of the data obtained by pre-scanning the entire scanning range R on both sides of the recording medium S can also be stored in the scan buffer 160. As a result, the areas to be scanned can be appropriately determined based on the result of reading the entire scanning range R. Note that the recording medium S could be pre-scanned one side at a time if the capacity of the scan buffer 160 is insufficient. Further alternatively, pre-scanning could be paused and the scanning areas determined midway through the scanning range R, and pre-scanning could then be resumed for the remaining half.

After the scanning areas are determined with one of the foregoing methods, the process continues from step S56 (FIG. 12) above.

When the scanned image data is sent to the host computer 200, the area numbers denoting the scanning areas identified by the dot impact printer 10, and information such as the coordinates of the start and end points of each area, could also be added to and sent with the scanned image data. In this configuration, the host computer 200 acquires the number and positions of the scanning areas set in the scanning range R, and uses this information to process the scanned image data.

Further alternatively, the dot impact printer 10 could scan all of the scanning range R and store the scanned image data for the entire scanning range R in the scan buffer 160, and the CPU 40 could determine the areas containing data to be read based on the stored scanned image data, and extract and send the image data scanned from those areas to the host computer 200. In this case information denoting the number of each area and the coordinates of the start and end positions of each area, for example, could be added and transmitted with the actual scanned image data.

This method captures all of the scanning range R on both sides of the recording medium S at one time, and the scanning time therefore does not increase regardless of the number of areas to be scanned. In addition, because the scanning areas are determined by a detailed analysis of an image of the entire scanning range R, the areas containing essential information or image content can be accurately identified. This method is effective when the capacity of the scan buffer 160 is sufficient relative to the size of the scanning range R and the scanning resolution.

As described above, the dot impact printer 10 according to a preferred embodiment of the invention includes a media transportation mechanism 100 that conveys a recording medium S; an optical reader 110 that optically reads the recording medium S conveyed by the media transportation mechanism 100 as a scanning medium; a scan buffer 160 that stores scanned image data from the optical reader 110; an interface 43 that sends scanned image data stored in the scan buffer 160 to the host computer 200; and a CPU 40 that sets a scanning area in the scanning range of the optical reader 110, and transmits the scanned image data stored in the scan buffer 160 for each set area by means of the interface 43. When a plurality of scanning areas are set, the CPU 40 determines the transmission sequence of each scanning area according to specific conditions, and transmits the scanned image data for each scanning area according to this transmission sequence.

As a result, when plural scanning areas are set in the range that can be scanned by the optical reader 110, the scanned image data is stored by scanning area, the transmission sequence is determined for each scanning area, the scanned image data is transmitted to the host computer 200 according to this sequence, and scanned image data stored in the scan buffer 160 can therefore be quickly transmitted. Therefore, because image data that has already been transmitted can be quickly deleted from the scan buffer 160 and the storage space released, the storage capacity of the scan buffer 160 can be used efficiently. In addition, delaying the scanning operation as a result of insufficient storage capacity in the scan buffer 160 can be avoided and throughput can be improved.

Furthermore, the dot impact printer 10 has a stationary optical reader 110 that has at least one scanner disposed to a transportation path through which a transportation mechanism conveys a recording medium S, reads at least one side of the recording medium S passing the optical reader 110, and can thereby quickly read a large area of a single recording medium S. In addition, by disposing two scanners, a first scanner 111 and second scanner 112, to the transportation path of the recording medium S at positions for respectively scanning the front and back sides of the recording medium S, both sides of the recording medium S can be read at one time. In this configuration scanning areas can be separately set for the front and back sides, and the transmission sequence can be determined for the areas set on both sides to transmit the scanned image data.

In addition, because the CPU 40 determines the transmission sequence of the individual scanning areas based on whether or not the host computer 200 can receive a large amount of scanned image data, the scanned image data can be sent sequentially from large to small when the host computer 200 can receive large amounts of scanned image data, for example, and storage space can be quickly released in the scan buffer 160. When the host computer 200 cannot receive large amounts of scanned image data, the scanned image data can be transmitted in order from small to large, thereby reducing the load on the host computer 200. The image data transmission sequence can thus be optimized based on the state of the host computer 200.

In addition, because the CPU 40 determines the transmission sequence of the scanning areas from large to small or small to large based on the size of the image data captured from plural scanning areas, scanned images containing a large amount of data can be transmitted first and the image data storage area in the scan buffer 160 can be quickly released, or scanned images containing a small amount of data can be transmitted first to reduce the load on the host computer 200 and dot impact printer 10.

Further alternatively, compatibility with prioritizing quick release of storage space in the scan buffer 160, and prioritizing reducing the load on the host computer 200 and dot impact printer 10, can be achieved by switching between these methods of determining the transmission order, and throughput can be improved while avoiding an extreme load on the host computer 200 and dot impact printer 10.

Furthermore, because the CPU 40 segments a scanning area into plural image data blocks for scanning and transmission when the size of the scanning area in the transportation direction exceeds a specific limit, and determines the relative sizes of the image data from each scanning area based on the size of each area perpendicular to the scanning direction of the scanning areas, the size of the image data captured from each scanning area can be quickly determined. As a result, the process of setting the transmission sequence of each scanning area from large to small or small to large based on the size of the scanned image data can be executed quickly and throughput can be improved.

Further alternatively, the CPU 40 could set the transmission sequence of plural scanning areas to the order in which the optical reader 110 starts scanning each area, or the order in which the optical reader 110 finishes scanning each area. Because the transmission sequence is determined in this configuration so that transmission proceeds in the order in which the optical reader 110 starts scanning each area or the order in which the optical reader 110 completes scanning each area, the scanned image data is transmitted in the order in which it is stored in the scan buffer 160. As a result, storage space in the scan buffer 160 can be quickly released and throughput can be improved.

A preferred embodiment of the invention is described above, but the invention is not limited thereto. For example, both sides of the recording medium S are scanned at the same time in the foregoing embodiment, but the invention can also be applied when scanning only one side.

Furthermore, a configuration in which the alignment mechanism 28, recording head 18, and optical reader 110 are disposed in this order to the transportation path P of the recording medium S is described in the foregoing embodiment, but the invention is not so limited and the locations of these devices can be changed as desired. For example, the optical reader 110 could be disposed closest to the manual insertion opening 15.

In addition, the foregoing embodiment describes a control unit that is disposed to a control circuit board (not shown in the figure) installed in the dot impact printer 10, has the functions shown in the function blocks in FIG. 4, and controls other parts of the dot impact printer 10, but a device externally connected to the dot impact printer 10 could function as the function units shown in FIG. 4 and control operation of the dot impact printer 10. In addition, the function blocks shown in FIG. 4 are rendered by cooperation of hardware and software components, but the specific configuration of the hardware component and the specifications of the software component are not limited, and the detailed configurations thereof can be changed as desired.

Furthermore, the first scanner 111 and second scanner 112 in the foregoing embodiment are described as using RGB light sources to enable monochrome or color scanning, but a configuration using an infrared light source to enable infrared scanning is also conceivable. Furthermore, because magnetic ink has higher infrared absorbance than normal ink, infrared light can be used to read only the characters printed in magnetic ink, thereby enabling optically reading the MICR text in the MICR area MA efficiently.

The foregoing embodiment describes the invention applied to a flatbed scanner that conveys the recording medium S horizontally, but the invention is not so limited and can obviously be applied to a device with a transportation path that conveys recording media S such as checks and slips standing vertically on edge.

The foregoing embodiment also describes a dot impact printer 10 having an optical reader 110, but the invention is not so limited and can obviously be applied to other configurations having an optical reading unit comparable to the optical reader 110 disposed to an inkjet printer, thermal printer, or laser printer, for example. Yet further, the invention is not limited to devices that are used as a stand-alone printer, and configurations having an optical reading unit comparable to the optical reader 110 disposed in another device (such as an ATM (automated teller machine) or CD (cash dispenser)) are also conceivable.

Yet further, the invention is not limited to configurations rendering an optical reader 110 in unison with a device that records text or images on paper or other recording medium, and can obviously be applied to a wide range of other devices including stand-alone scanners and photocopiers.

Parts of the scanned image data where brightness is high are often part of the paper where nothing is written, and parts where brightness is low are often parts containing text or other markings. A specific threshold value can be used to discriminate high brightness parts and low brightness parts in the scanned image data captured from the entire surface of the scanned medium. The image data where brightness is low can be extracted as parts containing text or other desired content. The scanning areas can therefore be set based on the areas in the scanned image data where brightness is low. The threshold value can be set to the median between the highest and lowest brightness values. High brightness data and low brightness data can be identified by comparing the scanned image data with this threshold value.

Although embodiments, including preferred embodiments, of the present invention have been described with reference to the accompanying drawings, various changes and modifications will be apparent to those skilled in the art in light of such disclosure. Any and all such changes and modifications are to be understood as included within the scope of the present invention to the extent encompassed by any claim of this application.

What is claimed is:

1. An optical reading device configured for connection to a control device, the optical reading device comprising:
    an optical reading unit that optically reads information on a medium and converts the read information to digital image data;
    a storage unit that stores the digital image data captured by the optical reading unit;
    a transmission unit that transmits the digital image data to the control device; and
    a control unit that (i) sets a plurality of target areas on the medium, (ii) determines the transmission sequence of a plurality of portions of the digital image data obtained from the plurality of target areas respectively according to a specific condition, and (iii) causes the transmission unit to send the plurality of portions of the digital image data to the control device according to the transmission sequence;
    wherein the control unit determines the transmission sequence of at least some of the portions of digital image data based on their respective sizes.

2. The optical reading device described in claim 1, wherein the control unit sets an area on the medium where the brightness of corresponding digital image data is lower than the brightness of surrounding digital image data as one target area.

3. The optical reading device described in claim 1, further comprising:
    a transportation mechanism that conveys the medium along a transportation path;
    wherein at least one optical reading unit is disposed to the transportation path and reads data on at least one side of the medium as it passes the at least one optical reading unit.

4. The optical reading device described in claim 1, wherein the control unit detects a communication state of the control device, and based on the communication state determines the transmission sequence.

5. The optical reading device described in claim 1, wherein the control unit determines the size of a particular portion of digital image data of a particular target area based on at least one of: the size of the particular portion of digital image data in the transportation direction of the particular target area, and the size of the particular portion of the digital image data in the direction perpendicular to the transportation direction of the particular target area.

6. The optical reading device described in claim 1, wherein, when the size of the particular portion of digital image data of a particular target area exceeds a specific limit, the control unit segments that portion of digital image data and causes the transmission unit send that portion of digital image data to the control device in segments.

7. The optical reading device described in claim 1, wherein the control unit determines the transmission sequence of at least some of the portions of the digital image data in the order in which the optical reading unit starts reading or the order in which the optical reading unit completes converting.

8. A control method for an optical reading device that is configured for connection to a control device, the method comprising steps of:
    reading information on a medium and converting the read information to digital image data;
    storing the digital image data in a storage unit;
    setting a plurality of target areas on the medium; determining the transmission sequence of a plurality of portions of the digital image data obtained from the plurality of target areas respectively according to a specific condition; and
    sending the plurality of portions of the digital image data to the control device according to the transmission sequence;
    wherein the transmission sequence of at least some of the portions of digital image data is determined based on their respective sizes.

9. The control method for an optical reading device described in claim 8, wherein an area on the medium where the brightness of corresponding digital image data is lower than the brightness of surrounding digital image data is set as one target area.

10. The control method for an optical reading device described in claim 8, further comprising:
    conveying the medium along a transportation path;
    wherein the reading is carried out using at least one optical reading unit that is disposed to the transportation path and the at least one optical reading unit reads at least one side of the medium as it passes the optical reading unit.

11. The control method for an optical reading device described in claim 8, further comprising:
    detecting a communication state of the control device when determining the transmission sequence, and wherein the transmission sequence is determined based on the communication state.

12. The control method for an optical reading device described in claim 8, wherein:
    the size of a particular portion of digital image data in a particular target area is determined based on at least one of: the size of the particular portion of digital image data in the transportation direction of the particular target area, and the size of the particular portion of digital image data of the particular target area perpendicular to the transportation direction of the target area.

13. The control method for an optical reading device described in claim 8, wherein, when the size of a particular portion of digital image data of a particular target area exceeds a specific limit, the method further comprises segmenting the particular portion of digital image data and sending the segments to the control device.

14. The control method for an optical reading device described in claim 8, wherein, when determining the transmission sequence, the transmission sequence of at least some of the portions of digital image data is determined to be in the order in which the optical reading unit starts scanning or the order in which the optical reading unit completes converting.

15. A non-transitory storage medium storing a program executable by a control unit that controls at least a portion of an optical reading device that is configured for connection to a control device, the program containing instructions for:
    reading information on a medium and converting the read information to digital image data;
    storing the digital image data in a storage unit;
    setting a plurality of target areas on the medium; determining the transmission sequence of a plurality of portions of the digital image data obtained from the plurality of target areas respectively according to a specific condition; and sending the plurality of portions of the digital image data to the control device according to the transmission sequence;

wherein the transmission sequence of at least some of the portions of digital image data is determined based on their respective sizes.

* * * * *